United States Patent
Yairi et al.

(10) Patent No.: US 9,552,065 B2
(45) Date of Patent: Jan. 24, 2017

(54) DYNAMIC TACTILE INTERFACE

(71) Applicant: Tactus, Inc., Fremont, CA (US)

(72) Inventors: Micah B. Yairi, Fremont, CA (US);
Craig M. Ciesla, Fremont, CA (US);
Curtis Ray, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 67 days.

(21) Appl. No.: 14/521,350

(22) Filed: Oct. 22, 2014

(65) Prior Publication Data
US 2015/0138110 A1 May 21, 2015

Related U.S. Application Data

(60) Provisional application No. 61/894,256, filed on Oct. 22, 2013.

(51) Int. Cl.
*G06F 3/01* (2006.01)
*G06F 3/0488* (2013.01)
(Continued)

(52) U.S. Cl.
CPC .............. *G06F 3/016* (2013.01); *G06F 1/1632* (2013.01); *G06F 3/04886* (2013.01);
(Continued)

(58) Field of Classification Search
None
See application file for complete search history.

(56) References Cited

U.S. PATENT DOCUMENTS

| | | |
|---|---|---|
| 3,034,628 A | 5/1962 | Wadey |
| 3,659,354 A | 5/1972 | Sutherland |

(Continued)

FOREIGN PATENT DOCUMENTS

| | | |
|---|---|---|
| CN | 1260525 A | 7/2000 |
| CN | 1530818 A | 9/2004 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporatenews/070831.html.

(Continued)

*Primary Examiner* — Viet Pham
*Assistant Examiner* — Christopher Kohlman
(74) *Attorney, Agent, or Firm* — Jeffrey Schox; Padowithz Alce

(57) ABSTRACT

A dynamic tactile interface including a tactile layer defining a first region and a deformable region adjacent the first region; a substrate coupled to the tactile layer at the first region, defining a variable volume adjacent the deformable region and defining a fluid channel fluidly coupled to the variable volume; a set of rigid structures distributed across the tactile layer defining an anti-reflective coating over the tactile layer; and a displacement device fluidly coupled to the fluid channel, the displacement device displacing fluid into the fluid channel to transition the deformable region from a retracted setting to an expanded setting, the deformable region tactilely distinguishable from the first region in the expanded setting, the set of rigid structures conforming to the tactile layer, each rigid structure in the set of rigid structures shifting relative to an adjacent rigid structure in the set of rigid structures.

18 Claims, 11 Drawing Sheets

(51) Int. Cl.
 G02B 1/115 (2015.01)
 G02B 1/118 (2015.01)
 G06F 1/16 (2006.01)

(52) U.S. Cl.
 CPC .............. *G02B 1/115* (2013.01); *G02B 1/118* (2013.01); *G06F 1/1626* (2013.01); *G06F 2203/04809* (2013.01)

(56) References Cited

U.S. PATENT DOCUMENTS

| | | | |
|---|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | MacLean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,015,894 B2 | 3/2006 | Morohoshi |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |

(56) References Cited

U.S. PATENT DOCUMENTS

| | | |
|---|---|---|
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |

(56) References Cited

U.S. PATENT DOCUMENTS

| | | |
|---|---|---|
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 | 3/2016 | Birnbaum |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0131624 A1* | 6/2008 | Egami ............... G06F 3/045 428/1.1 |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |

(56) References Cited

U.S. PATENT DOCUMENTS

| | | |
|---|---|---|
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0028305 A1* | 2/2011 | Lim ................ B01J 21/063 502/2 |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0162774 A1* | 6/2012 | Ishida ................ G02B 1/111 359/601 |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0206213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1* | 9/2012 | Ciesla ................ G06F 3/0202 345/173 |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0064405 A1* | 3/2015 | Koch, III ................ G02B 1/118 428/147 |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| JP | S63164122 A | 7/1998 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

(56) References Cited

FOREIGN PATENT DOCUMENTS

OTHER PUBLICATIONS

Jeong et al., "Tunable Microdoublet Lens Array," Optical Society of America, Optics Express; vol. 12, No. 11. 31 May 2004, 7 Pages.
Preumont, a. Vibration Control of Active Structures: an Introduction, Jul. 2011.
Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.
Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014-]. Retrieved from the internet. URL: <https://www.google.com/webhp?sourceid=chrome-instant&ion=1&espv=2&ie=UTF-8#q=materials-05-01125.pdf>.

\* cited by examiner

DYNAMIC TACTILE INTERFACE

CROSS REFERENCE TO RELATED APPLICATIONS

This application claims the benefit of U.S. Provisional Application No. 61/894,256, filed on 22 Oct. 2013, which is incorporated in its entirety by this reference.

This application is related to U.S. patent application Ser. No. 11/969,848, filed on 4 Jan. 2008; U.S. patent application Ser. No. 13/414,589, filed 7 Mar. 2012; U.S. patent application Ser. No. 13/456,010, filed 25 Apr. 2012; U.S. patent application Ser. No. 13/456,031, filed 25 Apr. 2012; U.S. patent application Ser. No. 13/465,737, filed 7 May 2012; U.S. patent application Ser. No. 13/465,772, filed 7 May 2012, U.S. patent application Ser. No. 14/035,851, filed on 25 Sep. 2013; U.S. patent application Ser. No. 12/652,708, filed on 5 Jan. 2010; and U.S. Patent Application No. 61/871,081, filed on 28 Aug. 2013; all of which are incorporated in their entirety by reference.

TECHNICAL FIELD

This invention relates generally to the field of touch-sensitive displays, and more specifically to a dynamic tactile interface for a touch-sensitive display.

DESCRIPTION OF THE EMBODIMENTS

The following description of the embodiments of the invention is not intended to limit the invention to these embodiments, but rather to enable any person skilled in the art to make and use this invention.

1. Dynamic Tactile Interface

Figure 1A:
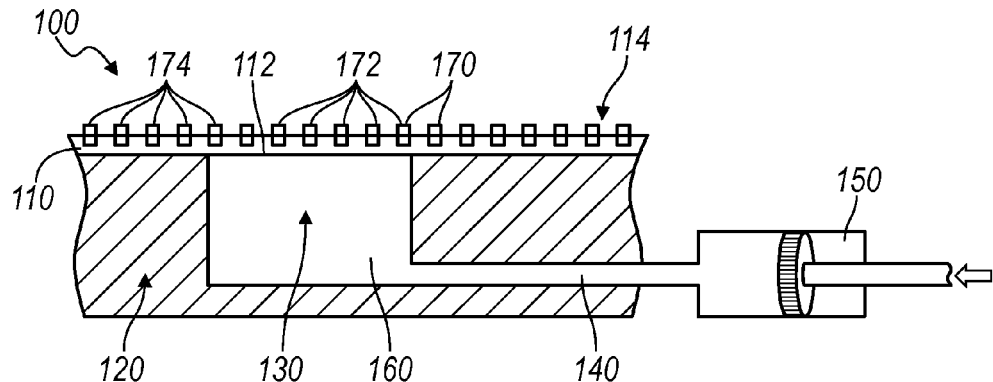
FIGS. 1A, 1B, and 1C are schematic representations of a dynamic tactile interface in a retracted setting and an expanded setting, respectively.
Figure 1B:
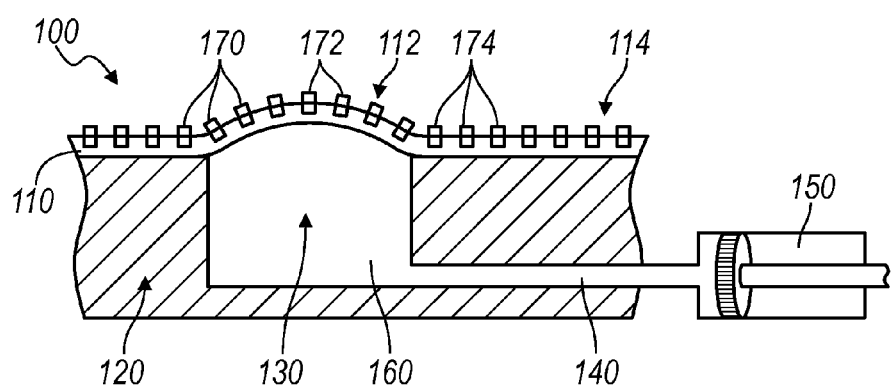
Figure 1C:
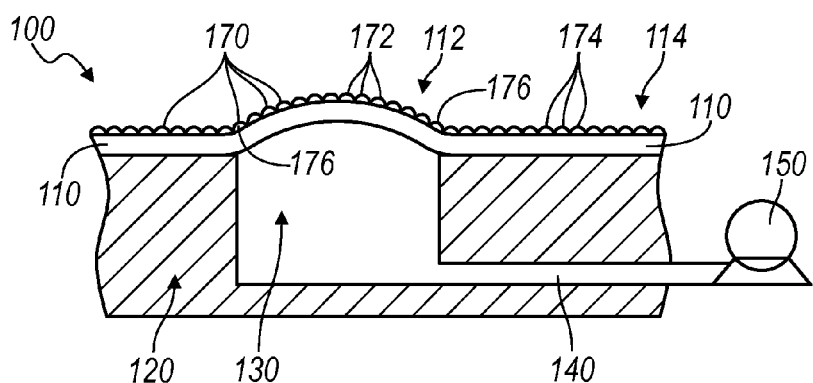

As shown in FIGS. 1A, 1B and 1C, a dynamic tactile interface 100 with an anti-reflective coating includes: a tactile layer 110 defining a first region 114 and a deformable region 112 adjacent the first region 114; a substrate 120 coupled to the tactile layer 110 at the first region 114, defining a variable volume 130 adjacent the deformable region 112 and defining a fluid channel 140 fluidly coupled to the variable volume 130; a set of rigid structures 170 distributed across the tactile layer 110 over the tactile layer 110, the set of rigid structures 170 including a first subset of rigid structures 174 coincident the first region 114 and a second subset of rigid structures 172 coincident the deformable region 112; and a displacement device 150 fluidly coupled to the fluid channel 140, the displacement device 150 displacing fluid into the fluid channel 140 to transition the deformable region 112 from a retracted setting to an expanded setting, the deformable region 112 tactilely distinguishable from the first region 114 in the expanded setting, the second subset of rigid structures 172 conforming to the deformable region 112, each rigid structure in the second subset of rigid structures 172 shifting relative to an adjacent rigid structure in the second subset of rigid structures 172 and shifting relative to each rigid structure in the first subset of rigid structures 174, the first subset of rigid structures 174 conforming to the first region 114.

Figure 3:
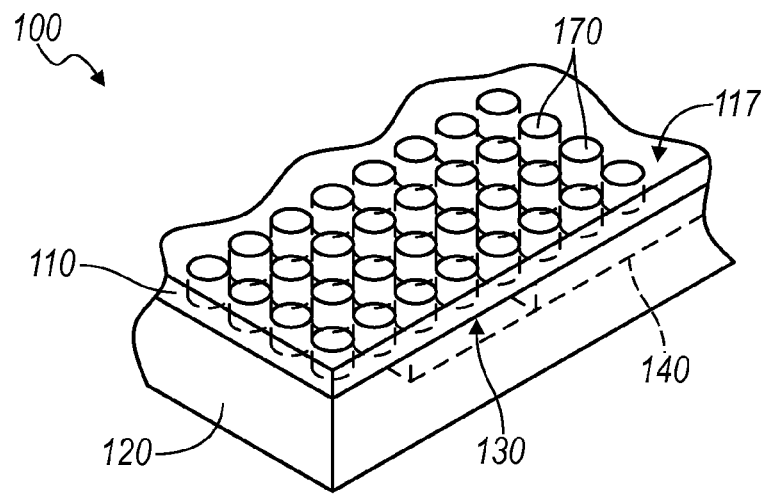
FIG. 3 is a schematic representation of a variation of the dynamic tactile interface.

A variation of the dynamic tactile interface 100 shown in FIG. 3 alternatively includes the set of rigid structures 170 patterned across the first region 114 and the deformable region 112, each rigid structure in the set of rigid structures 170 at least partially embedded in the tactile layer 110 with a portion of each rigid structure offset above a surface of the tactile layer 110, the set of rigid structures 170 coupled to the tactile layer 110 and a displacement device 150 fluidly coupled to the fluid channel 140, the displacement device 150 displacing fluid into the fluid channel 140 to transition the deformable region 112 from a retracted setting to an expanded setting, the deformable region 112 tactilely distinguishable from the first region 114 in the expanded setting, the second subset of rigid structures 172 conforming to the deformable region 112, each rigid structure in the second subset of rigid structures 172 shifting relative to an adjacent rigid structure in the second subset of rigid structures 172 and shifting relative to each rigid structure in the first subset of rigid structures 174, the first subset of rigid structures 174 conforming to the first region 114.

Another variation of the dynamic tactile interface 100 further includes the set of rigid structures 170 protruding from an anti-reflective layer 190 coupled to and arranged over the tactile layer 110 along an attachment surface of the anti-reflective layer 190, the anti-reflective layer 190 substantially firm, the set of rigid structures 170 patterned across a surface of the anti-reflective layer 190 opposite the attachment surface and extending from the attachment surface; and wherein the displacement device 150 transitions the deformable region 112 into the expanded setting, a portion of the anti-reflective layer 190 coincident the deformable region 112 conforming to the deformable region 112, a second portion of the anti-reflective layer 190 coincident the first region 114 conforming to the first region 114, the anti-reflective layer 190 preferentially cracking about a periphery of each rigid structure.

Yet another variation of the dynamic tactile interface 100 further includes a touch sensor 106 coupled to the substrate 120 and outputting a signal corresponding to an input on a tactile surface of the tactile layer 110 adjacent the deformable region 112 and adjacent the anti-reflective coating; and a housing 108 transiently engaging a mobile computing device, the housing 108 transiently retaining the substrate 120 over a display 102 of the mobile computing device.

2. Applications

The dynamic tactile interface 100 can define a deformable region 112, which can selectively expanded and retract to provide intermittent tactile guidance at the tactile layer 110, such as for a user interacting with a computing device incorporating the dynamic tactile interface 100. The dynamic tactile interface 100 can be applied as dynamic surface for an electronic device receiving tactile inputs. In particular, the dynamic tactile interface 100 can be applied to an electronic device incorporating a touchscreen, such as a tablet, smartphone, laptop computer, desktop computer, personal data assistant (PDA), personal music player (e.g., MP3 player), an automotive dashboard display or console, stereo interface, a television, or a personal navigation device. The dynamic tactile interface 100 can also be applied to a watch, a home stereo system interface, a lighting or thermostat control system, a machine tool controller, a computer mouse, a computer touchpad, a keyboard or keypad, a gaming controller or console, cooking equipment, or any other suitable electronic and/or digital computing device. The dynamic tactile interface 100 can be laid (e.g., transiently installed) over a touchscreen to enable tactile guidance for a user interacting with the touchscreen. For example, the dynamic tactile interface 100 can be integrated into or applied over a touchscreen of a computing device to selectively and intermittently represent physical hard keys (e.g., round or rectangular buttons) substantially aligned with input keys render on an adjacent display 102. In one implementation, in the retracted setting, the deformable region 112 can be planar or flush with the first region 114, and, in the expanded setting, the deformable region 112 can be raised above the first region 114 to define a tactilely distinguishable feature on the tactile surface. For example, the displacement device 150 can transition the deformable region 112 to the expanded setting when the user applies an input, such as with a finger or stylus, to a surface of the tactile layer 110. In this example, the displacement device 150 can transition the deformable region 112 to the retracted setting when the user removes the input from the tactile layer 110, the displacement device 150 deforming the tactile layer 110 to a substantially planar or flush configuration.

The dynamic tactile interface 100 can be applied over or integrated into a display. The dynamic tactile interface 100 can be substantially transparent, such as described in U.S. patent application Ser. No. 13/414,589, which is herein incorporated in its entirety by this reference. In this implementation, the dynamic tactile interface 100 can also set vertical positions (e.g., heights above the first region 114) of one or more deformable regions 112 in the tactile layer to modify optics of the dynamic tactile interface 100 for light output from the display. The dynamic tactile interface 100 can also set vertical positions of one or more deformable regions 112 to provide distinct tactilely distinguishable features across the tactile surface.

Generally, the displacement device 150 of the dynamic tactile interface 100 can displace fluid into and out of the fluid channel 140 to transition the deformable region 112 of the dynamic tactile interface 100 between retracted and expanded settings. In one implementation, the deformable region 112 can be substantially flush with the adjacent first region 114 in the retracted setting, such that the surface geometry is substantially continuous (e.g., flat, planar, smooth) across the deformable region 112 and the first region 114 in the retracted setting. In this implementation, fluid displaced into the fluid channel 140 can expand the deformable region 112, thereby elevating the deformable region 112 above the first region 114 in the expanded setting. In another implementation, the deformable region 112 can be substantially flush with the adjacent first region 114 in the expanded setting and offset below the first region 114 in the retracted setting.

Figure 15:
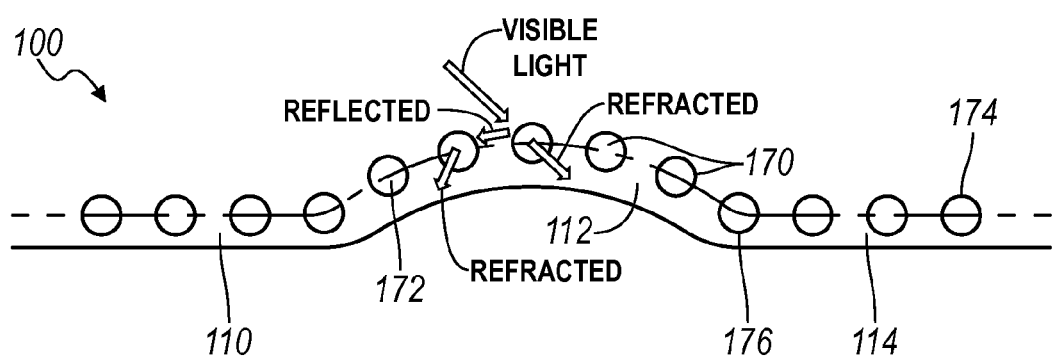
FIG. 15 is a schematic representation of a variation of the dynamic tactile interface.

The set of rigid structures 170 can be applied over (e.g. adhered to, etc.) or integrated into (e.g., etched into, embedded in, deposited into, grown from, etc.) the tactile layer 110, thereby defining a anti-reflective coating to limit glare (perceived by a user engaging with the dynamic tactile interface 100) across the tactile layer 110, the glare generated by reflection of an ambient light source (e.g., the Sun) at an angle of incidence. The set of rigid structures 170 can be composed of small, rigid particles extending from the tactile surface at a maximum height less than a wavelength of light and separated by a maximum center-to-center distance smaller than the wavelength of light. Thus, as shown in FIG. 15, the set of rigid structures 170 can function to limit reflection of light off the tactile surface for normal angles of incidence by creating a gradual refractive index gradient across the tactile layer 110 to encourage preferential absorption of light energy into the tactile layer 110 and, therefore, limit reflection of light off the tactile surface. Additionally, reflected light waves can reflect off the tactile surface out of phase with other reflected light waves, the reflected light waves canceling out the out of phase other reflected light waves, thereby minimizing glare off the tactile surface. Furthermore, the set of rigid structures 170 can change an angle of reflection of the light, thereby limiting glare generated when the angle of reflection equals the angle of incidence. The set of rigid structures 170 can conform to the tactile layer 110, such that, as the tactile layer 110 deforms at the deformable region 112, the set of rigid particles forms nodes outlining a three-dimensional surface defined by the deformable region 112. The set of rigid structures 170 can also limit reflection of light off the deformable region(s) in the expanded setting as the rigid structures can limit glare for various angles of incidence. The deformable region(s) can define a three-dimensional surface with multiple angles of incidence for light from the ambient light source (e.g., the Sun) in the expanded setting. Light incident on a three-dimensional surface (i.e., the deformable region(s)) reflect and refract at different angles than angles of reflection and refraction of light incident on a planar surface (e.g., the first region). As the set of rigid structures 170 conforms to the tactile layer 110, the set of rigid structures 170 can limit reflection off the deformable region(s) by changing the angle of reflection of light from an external source and preventing substantial reflection of the light from the external source back to the user. For the dynamic tactile interface 100 arranged over a display in a mobile computing device (e.g., a smartphone), the set of rigid structures 170 can thus reduce perceived glare from an external light source to enable a user to more clearly perceive images rendered on the display below the dynamic tactile interface 100. Additionally, the set of rigid structures 170 can create a scratch-resistant coating to protect the tactile layer 110. The set of rigid structures can function as an anti-glare coating to diffuse and fragment reflected light off the tactile surface. Additionally or alternatively, the set of rigid structures can function as an anti-reflective coating to diffuse internal and external waves of light in order to negate light transmitted through the tactile layer through destructive interference of light.

The dynamic tactile interface 100 can, therefore, enable selective and intermittent deformation of one or more deformable regions 112 between the retracted setting and the expanded setting to provide tactile (e.g., haptic) guidance to a user interacting with a connected computing device, such as a smartphone or tablet. Additionally, the set of rigid structures 170 can limit a user's perceived glare reflected off the tactile layer 110 by limiting reflection by changing the angle of reflection of incident light and exhibiting a gradual refractive index gradient across the tactile layer 110.

3. Tactile Layer

The tactile layer 110 defines the first region 114 and the deformable region 112 adjacent the first region 114. Generally, the tactile layer 110 functions to define the tactile surface, the deformable region 112, and the first region 114. The tactile surface defines an interaction surface through which a user can provide an input to an electronic device that incorporates (e.g., integrates) the dynamic tactile interface 100. The deformable region 112 defines a dynamic region of the tactile layer 110, which can expand to define a tactilely distinguishable formation on the tactile surface in order to, for example, guide a user input to an input region of the electronic device. The first region 114 attaches to the substrate 120 and defines a perimeter of the deformable region 112. Thus, the first region 114 cooperates with the deformable region 112 to define a configuration of the tactile layer 110 and, in particular, a shape of the tactile layer 110 when the deformable region 112 is in the expanded setting.

The tactile layer 110 can be transparent, translucent, or of any other optical clarity suitable to transmit light emitted by a display 102 across the tactile layer 110. Thus, the tactile layer 110 can function as a dynamic tactile interface 100 for the purpose of guiding, with the deformable region 112, an input to a portion of the display 102 corresponding to a rendered image. For example, deformable regions 112 can function as transient physical keys corresponding to discrete virtual keys of a virtual keyboard rendered on a display 102 coupled to the dynamic tactile interface 100. Alternatively, the tactile layer 110 can be substantially opaque or semi-opaque in an implementation in which the tactile layer 110 is applied over a computing device without a display 102. In this implementation, an opaque tactile layer 110 can yield a dynamic tactile interface 100 for receiving inputs on, for example, a touch sensitive surface of a computing device.

The tactile layer 110 can be elastic (and/or flexible, malleable) such that the tactile layer 110 can transition between the expanded setting and the retracted setting at the deformable region 112. As the first region 114 can be attached to the substrate 120, the first region 114 can substantially maintain a configuration as the deformable region 112 transitions between the expanded and retracted settings. Alternatively, the tactile layer 110 can include both an elastic portion and a substantially inelastic (e.g., rigid) portion. The elastic portion can define the deformable region 112; the inelastic portion can define the first region 114. Thus, the elastic portion can transition between the expanded and retracted setting and the inelastic portion can maintain a configuration as the deformable region 112 transitions between the expanded and retracted settings. Thus, the tactile layer 110 can be of one or more layers of PMMA (e.g., acrylic), silicone, polyurethane elastomer, urethane, PETG, polycarbonate, or PVC. Alternatively, the tactile layer 110 can be of one or more layers of any other material suitable to transition between the expanded and retracted settings at the deformable region 112.

Alternatively the tactile layer 110 can include one or more sublayers of similar or dissimilar materials. For example, the tactile layer 110 can include a silicone elastomer sublayer adjacent the substrate 120 and a polycarbonate sublayer joined to the silicone elastomer sublayer and defining the tactile surface. Optical properties of the tactile layer 110 can be modified by impregnating, extruding, molding, or otherwise incorporating particulate (e.g., metal oxide nanoparticles) into the layer and/or one or more sublayers of the tactile layer 110.

As described in U.S. application Ser. No. 14/035,851, which is herein incorporated in its entirety by this reference, the tactile layer 110 is coupled (e.g. attached or adhered) to the substrate 120 at the first region 114 and cooperates with the substrate 120 to define the variable volume 130 adjacent the deformable region 112. Thus, fluid displaced through the fluid channel 140 into the variable volume 130 can deform the deformable region 112 of the tactile layer 110 outwardly, thereby transitioning the deformable region 112 from the retracted setting substantially flush with the first region 114 into the expanded setting offset above and tactilely distinguishable from the first region 114. In the expanded setting, the deformable region 112 defines a tactilely distinguishable formation defined by the deformable region 112 in the expanded setting can be dome-shaped, ridge-shaped, ring-shaped, or of any other suitable form or geometry. When fluid is (actively or passively) released from behind the deformable region 112 of the tactile layer 110, the deformable region 112 transitions back into the retracted setting (shown in FIG. 1A). Alternatively, the deformable region 112 can transition between a depressed setting and a flush setting, the deformable region 112 in the depressed setting offset below flush with the first region 114 and deformed within the variable volume 130, the deformable region 112 in the flush setting substantially flush with the deformable region 112.

The tactile layer 110 can also exhibit anti-reflective properties. For example, the tactile layer 110 can include multiple interference layers stacked in such a way to induce a gradual refractive index gradient across the tactile layer 110. The multiple interference layers can be bonded or otherwise adhered, such that the layers can deform (and stretch) at the deformable region 112.

However, the tactile layer 110 can be of any other suitable material and can function in any other way to yield a tactilely distinguishable formation at the tactile surface.

4. Substrate

The substrate 120 couples to the tactile layer 110 at the first region 114, defining a variable volume 130 adjacent the deformable region 112 and defining a fluid channel 140 fluidly coupled to the variable volume 130. Generally, the substrate 120 functions to support the tactile layer 110, retain the first region 114, cooperate with the deformable region 112 to define a variable volume 130, and define a fluid channel 140 through which fluid travels toward and away from the deformable region 112 of the tactile layer 110 to expand and retract the deformable region 112.

The substrate 120 can be substantially transparent or translucent. For example, in one implementation, wherein the dynamic tactile interface 100 includes or is coupled to a display 102, the substrate 120 can be substantially transparent and transmit light output from an adjacent display 102. The substrate 120 can be PMMA, acrylic, and/or of any other suitable transparent or translucent material. The substrate 120 can alternatively be surface-treated or chemically-altered PMMA, glass, chemically-strengthened alkali-aluminosilicate glass, polycarbonate, acrylic, polyvinyl chloride (PVC), glycol-modified polyethylene terephthalate (PETG), polyurethane, a silicone-based elastomer, or any other suitable translucent or transparent material or combination thereof. Alternatively, the substrate 120 can be opaque or otherwise substantially non-transparent or translucent. For example, the substrate 120 can be opaque and arranged over an off-screen region of a mobile computing device. Additionally, the substrate 120 can include one or more transparent or translucent materials. For example, the substrate 120 can include a glass base sublayer bonded to walls or boundaries of the fluid channel 140 and the variable volume 130. The substrate 120 can also include a deposited layer of material exhibiting adhesion properties (e.g., an adhesive tie layer or film of silicon oxide film), the deposited layer distributed across an attachment surface of the substrate 120 to which the tactile adheres and functioning to retain contact between the first region 114 of the tactile layer 110 and the attachment surface of the substrate 120 despite fluid pressure raising above the first region 114 the deformable region 112 and, thus, attempting to pull the tactile layer 110 away from the substrate 120. Additionally, the substrate 120 can be substantially relatively rigid, relatively elastic, or exhibit any other material rigidity property. However, the substrate 120 can be formed in any other way, be of any other material, and exhibit any other property suitable to support the tactile layer 110 and define the variable volume 130 and fluid channel 140.

The substrate 120 can define (or cooperate with the tactile layer 110, a display 102, etc. to define) the variable volume 130 that communicates fluid from the fluid channel 140 to the deformable region 112 of the tactile layer 110. The variable volume 130 can substantially correspond to (e.g., lie adjacent) the deformable region 112 of the tactile layer 110. The variable volume 130 can be machined, molded, stamped, etched, etc. into or through the substrate 120 and can be fluidly coupled to the fluid channel 140, the displacement device 150, and the deformable region 112. A bore intersecting the fluid channel 140 can define the variable volume 130 such that fluid can be communicated from the fluid channel 140 toward the variable volume, thereby transitioning the deformable region 112 from the expanded setting to retracted setting. The axis of the variable volume 130 can be normal a surface of the substrate 120, can be non-perpendicular with the surface of the substrate 120, of non-uniform cross-section, and/or of any other shape or geometry.

The substrate 120 can define (or cooperate with the sensor 106, a display 102, etc. to define) the fluid channel 140 that communicates fluid through or across the substrate 120 to the variable volume 130. For example, the fluid channel 140 can be machined or stamped into the back of the substrate 120 opposite the attachment surface, such as in the form of an open trench or a set of parallel open trenches. The open trenches can then be closed with a substrate 120 backing layer, the sensor 106, and/or a display 102 to form the fluid channel 140. A bore intersecting the open trench and passing through the attachment surface can define the variable volume 130, such that fluid can be communicated from the fluid channel 140 to the deformable layer to transition the deformable region 112 (adjacent the variable volume 130) between the expanded and retracted settings. The axis of the variable volume 130 can be normal the attachment surface, can be non-perpendicular with the attachment surface, of non-uniform cross-section, and/or of any other shape or geometry. Likewise, the fluid channel 140 be normal the attachment surface, can be non-perpendicular with the attachment surface, of non-uniform cross-section, and/or of any other shape or geometry. However, the fluid channel 140 and the variable volume 130 can be formed in any other suitable way and be of any other geometry.

The substrate 120 can define the attachment surface, which functions to retain (e.g., hold, bond, and/or maintain the position of) the first region 114 of the tactile layer 110. In one implementation, the substrate 120 is planar across the attachment surface, such that the substrate 120 retains the first region 114 of the tactile layer 110 in planar form, such as described in U.S. patent application Ser. No. 12/652,708. However, the attachment surface of the substrate 120 can be of any other geometry and retain the tactile layer 110 in any other suitable form. In the retracted setting, the deformable region 112 can be flush with the first region 114. For example, the substrate 120 can define a substantially planar surface across an attachment surface and a support surface 122 that faces the tactile layer 110, the attachment surface retaining the first region 114 of the tactile layer 110, and the support surface 122 adjacent and substantially continuous with the attachment surface and supporting the deformable region 112 against substantial inward deformation into the variable volume 130 (e.g., due to an input applied to the tactile surface at the deformable region 112). In this example, the substrate 120 can define the variable volume 130, which passes through the support surface 122, and the attachment surface can retain the first region 114 in substantially planar form. The deformable region 112 can rest on and/or be supported in planar form against the support surface 122 in the retracted setting, and the deformable region 112 can be elevated off of the support surface 122 in the expanded setting. The support surface 122 can thus support the deformable region 112 of the tactile layer 110 against inward deformation past the plane of the attachment surface.

5. Rigid Structures

The set of rigid structures 170 can be distributed across the tactile layer 110 forming an anti-reflective coating over the tactile layer 110, the set of rigid structures 170 including a first subset of rigid structures 174 coincident the first region 114 and a second subset of rigid structures 172 coincident the deformable region 112. Generally, the set of rigid structures 170 functions to define an anti-reflective and coating over the tactile layer 110 to limit glare from light reflected off the tactile surface. Additionally, the set of rigid structures 170 can function to resist wear and/or abrasion of the tactile layer 110 (e.g., across the tactile surface). In particular, the set of rigid structures 170 can cooperate with the tactile layer 110 to define a rough or "bumpy" surface that is (substantially) tactilely indistinguishable to a user, the set of rigid structures 170 forming microscopic and/or nanoscopic nodules of the rough surface extending above the tactile layer 110 and separated by a distance such that incident light on the surface crosses a gradual refractive index gradient as the incident light passes from ambient air into the tactile layer 110. The gradual refractive index gradient functions to preferentially refract light and limit reflection off the tactile surface. To render a gradual refractive index gradient, the set of rigid structures 170 includes a set of structures of a material substantially harder and/or more rigid than the tactile layer 110. The tactile layer 110 itself can be substantially resilient to scratching, marring, abrasion, cracking, wear, or other damage of the tactile layer 110 and, for example, at the tactile surface. The tactile layer 110 can be substantially resilient to damage by surfaces that contact the tactile surface. For example, the dynamic tactile interface 100 can resist abrasion by a stylus, a fingernail, fabric of a pocket, asphalt, a key, etc. However, the set of rigid structures can further protect the tactile layer from wear and resistance. Thus, the tactile layer 110 and set of rigid structures can resist formation of optical aberrations that obscure, for example, an image rendered by a display 102 coupled to the dynamic tactile interface 100.

Each rigid structure in the set of rigid structures 170 can be of any suitable material, such as glass, metal, silicate, ceramic, polycarbonate, acrylic, etc. The set of rigid structures 170 can be of material with a modulus of elasticity of an order of magnitude (or several orders of magnitude) greater than that of material that defines the tactile layer 110. Additionally, each rigid structure in the set of rigid structures 170 can be substantially cylindrical, spherical, cubic, tetrahedral, conical, frustoconical, prismatic, cilia-like, or any other suitable form or geometry. In one example, the set of rigid structures 170 includes a set of substantially spherical objects, such as beads. In this example, the beads can be micro- or nanoscopic glass (e.g., silicate) spheres implanted in the tactile layer 110, which, in this example, can be formed from urethane.

The set of rigid structures 170 can define the first subset of rigid structures 174 attached to or (partially) embedded in the first region 114 and the second subset of rigid structures 172 attached to or (partially) embedded the deformable region 112. The first subset of rigid structures 174 can be of a particular shape and size (e.g., spherical and less than 500 nanometers), arranged across the first region 114 with a particular distribution density (i.e. ten rigid structures per five square micrometers), offset above the tactile surface at a particular height (e.g., 250 nanometers), and arranged across the first region 114 in a particular pattern (e.g., in concentric spirals). The second subset of rigid structures 172 can be of the same (or substantially similar) particular shape and size, distribution density, height, and pattern as the first subset of rigid structures 174 but arranged over the deformable region 112. Alternatively, the second subset can be of a distinct shape(s) and size(s), distribution density, height, and pattern. The second subset of rigid structures 172 can be configured to maintain anti-reflective and anti-glare efficacy in both the retracted and expanded settings. Thus, the second subset conforms and can accommodate deformation of the tactile layer 110 under and/or around the rigid structures. Additionally, the second subset can be configured to exhibit improved anti-reflective properties when the deformable region 112 is in the expanded setting relative to anti-reflective properties when the deformable region 112 is in the retracted setting.

For example, each rigid structure in the second subset can be of a shape with a flat upper surface and many facets on peripheral surfaces that, in the retracted setting, fit together forming an effectively continuous layer over the tactile surface. In the expanded setting, valleys between adjacent rigid structures can form, thus exposing the many facets on the peripheral surfaces to incident light. In this example, the second subset can form a seemingly continuous and gradual refractive index gradient, such that the rigid structures limit reflection of incident light off the tactile surface, due the many facets on the exposed peripheral surfaces. Likewise, the second subset can be configured to exhibit improved anti-reflective properties when the deformable region 112 is in the retracted setting relative to anti-reflective properties when the deformable region 112 is in the expanded setting.

Figure 12:
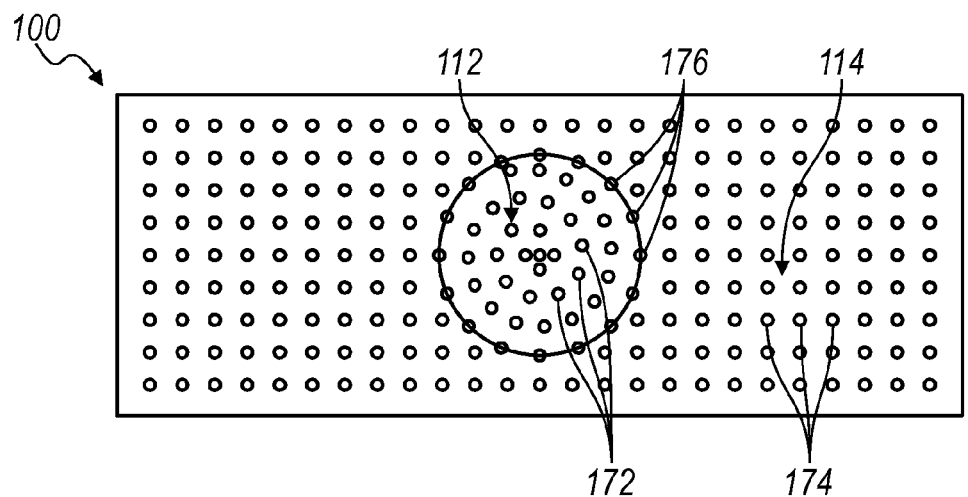
FIG. 12 is a schematic representation of a variation of the dynamic tactile interface.

In one implementation, the set of rigid structures 170 can include a third subset of rigid structures 176 coincident an intersection of the deformable region 112 and the first region 114. Thus, when the deformable region 112 transitions between the expanded and retracted setting, each rigid structure in the third subset of rigid structures 176 shifts relative to an adjacent rigid structure in the third subset of rigid structures 176, each rigid structure in the first subset of structures, and each rigid structure in the second subset of structures. The third subset can function to bridge an intersection between the first subset and the second subset of rigid structures 172, thereby forming a substantially continuous distribution of rigid structures across the tactile layer 110. The third subset of rigid structures 176 can be of substantially the same size, material, geometry, and/or distributed with the same distribution density and pattern as the first subset and/or the second subset of rigid structures 172. However, the third subset of rigid structures 176 can be of any other geometry, size, and distribution. For example, as shown in FIG. 12, the second subset of rigid structures 172 can include a set of spherical beads arranged over the deformable region 112 in a spiral pattern spiraling from a center of the deformable region 112 outward toward a periphery of the deformable region 112. The first subset of rigid structures 174 can include a set of spherical beads of various sizes partially embedded in the tactile layer 110 at the first region 114 in substantially linear arrays. The third subset of rigid structures 176 can include a set of droplets sputtered on the tactile layer 110 about the intersection between the deformable region 112 and the first region 114, thereby filling a void in rigid structures between the first subset of rigid structures 174 and the second subset of rigid structures 172. In the expanded setting, the second subset of rigid structures 172 can form a convex surface as perceived by a user external the dynamic tactile interface 100, the first subset of rigid structures 174 can form a substantially planar surface, and the third subset of rigid structures 176 can form a substantially convex surface linking the convex surface with the planar surface. Thus, the third subset can form a substantially continuous surface and anti-reflective coating conforming to the tactile layer 110.

Generally, the rigid structures can be of a substantially rigid, wear-resilient, and damage-resilient material. The rigid structures can be applied over, embedded in, etched into, or otherwise coupled to the tactile layer 110. By applying and/or implanting the rigid structures into the (substantially elastic) tactile layer 110, the tactile surface of the tactile layer 110 can become substantially wear-resistant and resilient to damage while maintaining elasticity at the deformable region 112. As the deformable region 112 of the tactile layer 110 transitions from the retracted setting to the expanded setting, center-to-center distance can decrease between two adjacent rigid structures on a first side of a neutral axis of the deformable region 112 and center-to-center distance can increase between two adjacent rigid structures on a side opposite the neutral axis to the first side, such that the tactile layer 110 elastically stretches and compresses while each rigid structure remains substantially undeformed.

Figure 2A:
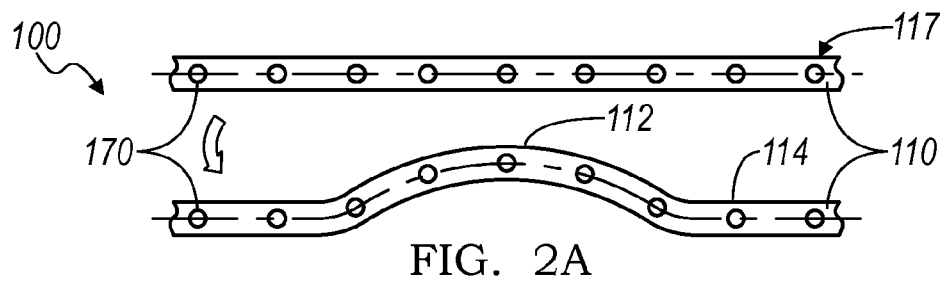
FIGS. 2A-2E are flowchart representations of variations of the dynamic tactile interface.
Figure 2B:
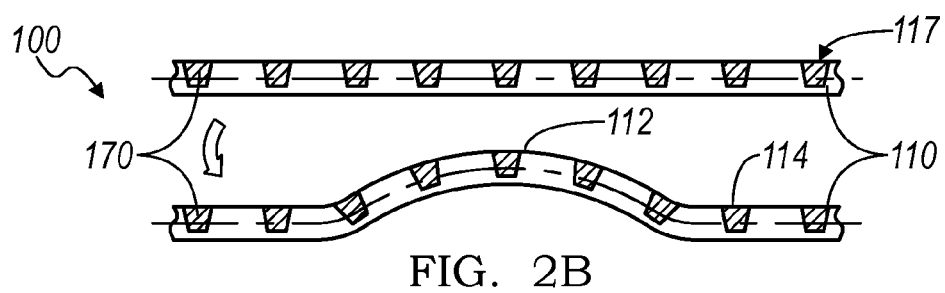
Figure 2C:
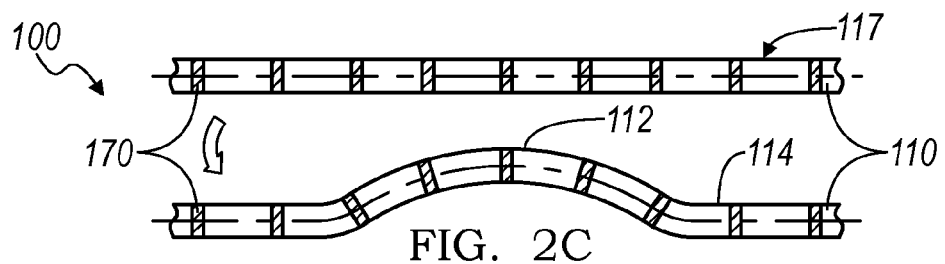
Figure 2D:
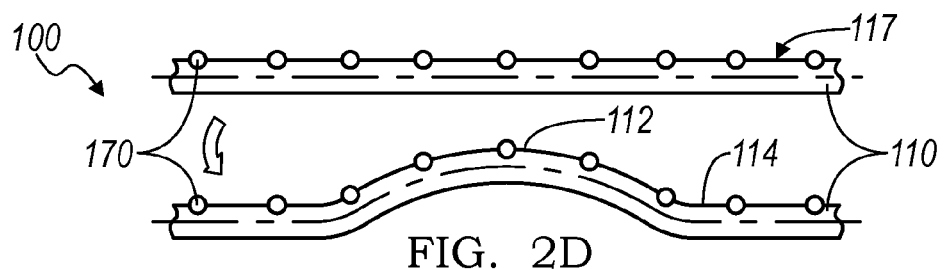
Figure 2E:
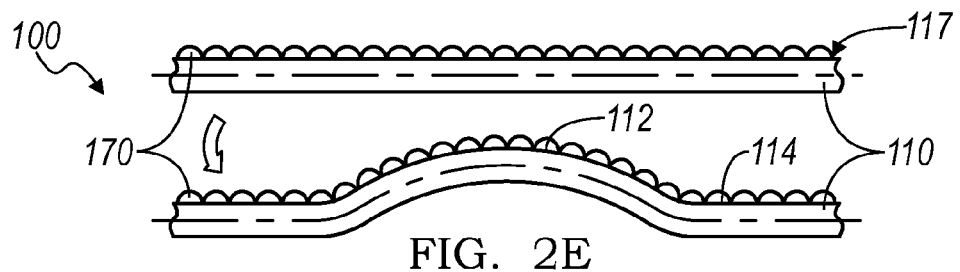
Figure 5:
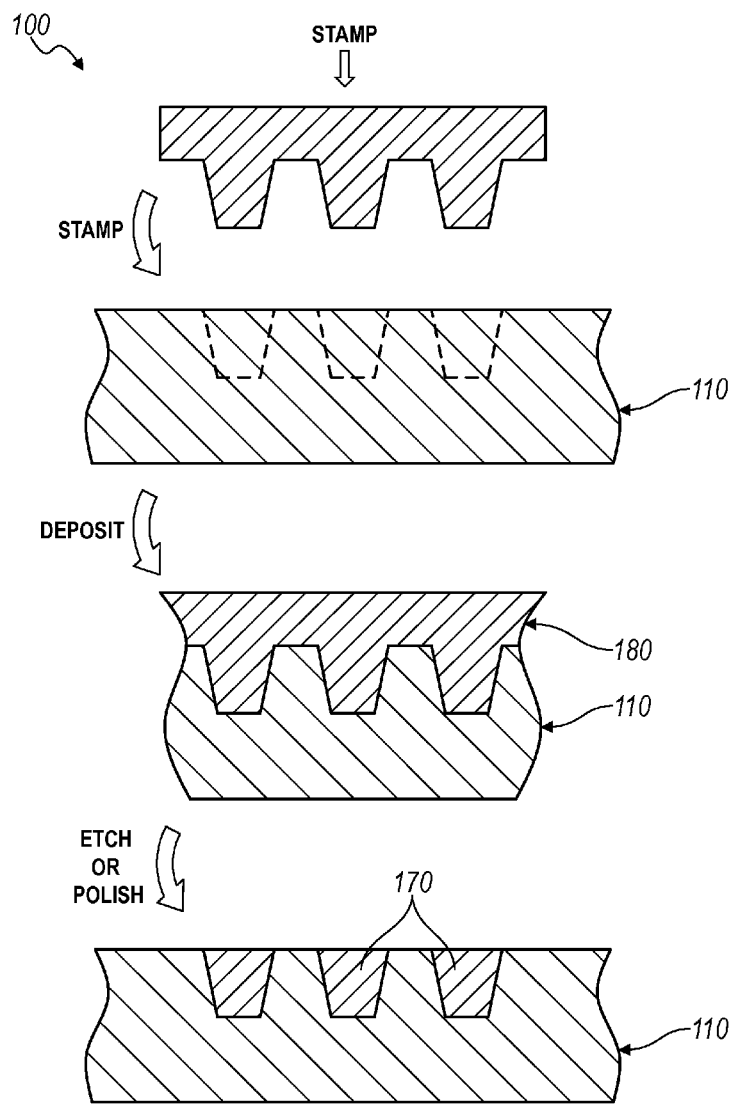
FIG. 5 is a flowchart representation of a manufacturing method in accordance with a variation of the dynamic tactile interface.
Figure 6:
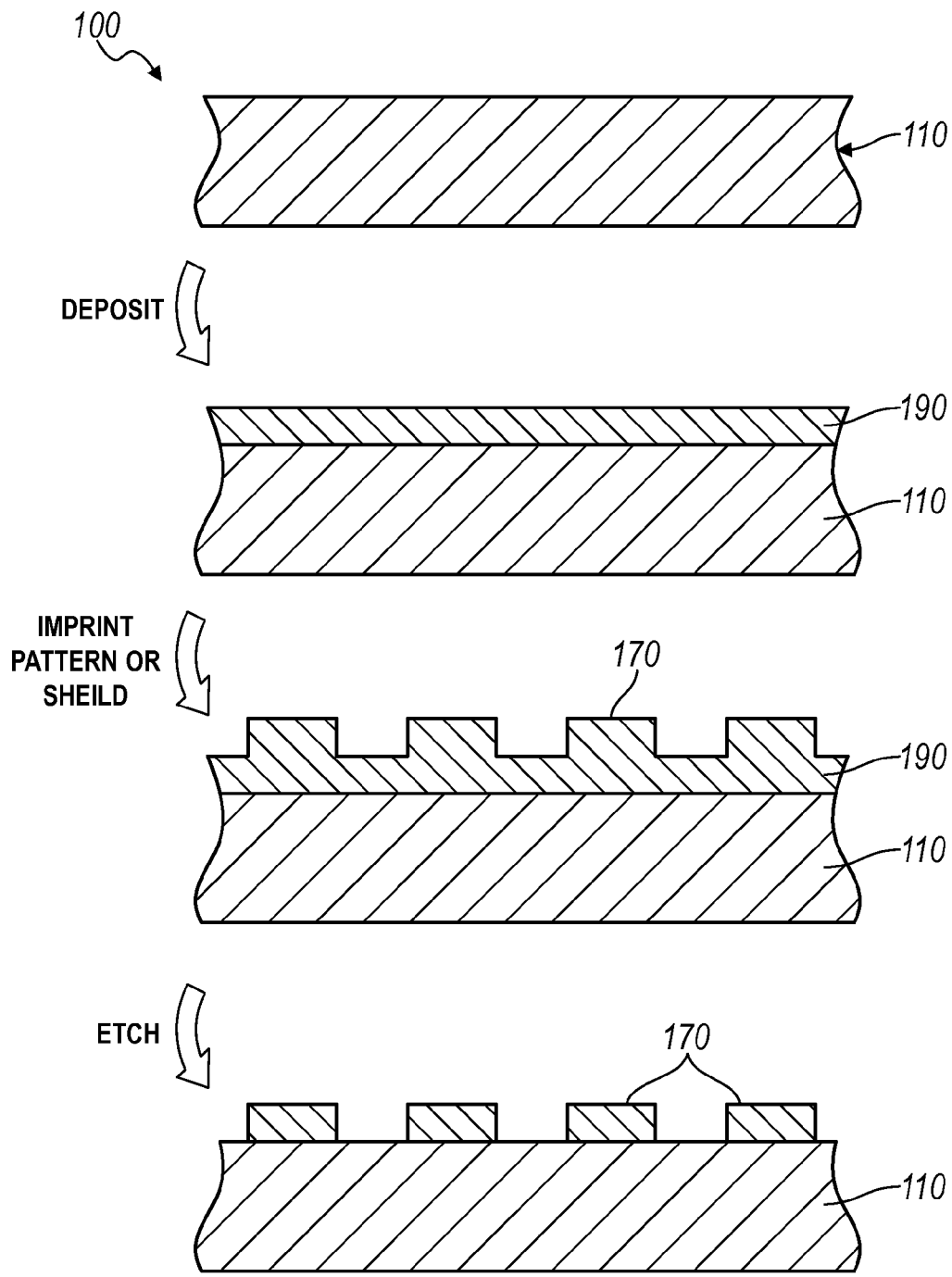
FIG. 6 is a flowchart representation of a manufacturing method in accordance with a variation of the dynamic tactile interface.

The set of rigid structures 170 can be arranged over the tactile layer 110 (FIG. 2E), partially embedded in the tactile layer 110 (FIG. 2D), and/or fully buried in the tactile layer 110 (FIGS. 2A-2C). Additionally, the set of rigid structures 170 (or a subset of the set of rigid structures 170) can be fully buried in the tactile layer 110 with an upper portion of each rigid structure in the subset of rigid structures 170 substantially flush with the tactile surface (shown in FIG. 2B). The set of rigid structures 170 can also be fully buried in the tactile layer 110 with a surface of each rigid structure flush with the tactile surface and a second surface of each rigid structure flush with a surface of the tactile layer 110 to adjacent the attachment surface of the substrate 120 (shown in FIGS. 2C and 5). The set of rigid structures 170 (or a subset of the set of rigid structures 170) can also be partially embedded in the tactile layer 110, such that a portion of each rigid structure protrudes from the tactile layer 110 at a height above the tactile surface (FIG. 2D). The set of rigid structures 170 can also be adhered (or bonded, welded, etc.) on top of the tactile surface as shown in FIG. 6. However, the set of rigid structures 170 (or a subset of the set of rigid structures 170) can be arranged and/or coupled to the tactile layer 110 in any other suitable way. In one example of the set of rigid structures 170, a first subset of the set rigid structures can be adhered on top of the tactile surface, such as with an epoxy or other adhesive. The first subset can extend from the tactile layer 110 at a first height above the tactile surface. A second subset of the set of rigid structures 170 can be partially embedded in the tactile layer 110, such that a portion of each rigid structure in the second subset can protrude from the tactile layer 110 at a second height above the tactile surface, the first height substantially the equal to the second height.

The set of rigid structures 170 can include rigid structures of any shape, size, and/or geometry and can include a set of rigid structures 170 of various shapes, sizes, and/or geometries. In particular, the set of rigid structures 170 can be substantially spherical, hemi-spherical, cylindrical, polyhedral, pyramidal, or any other shape or form. Furthermore, the set of rigid structures 170 can be solid, porous, hollow, etc. Additionally, the set of rigid structures 170 can be microscopic, mesoscopic (i.e., between one hundred nanometers and 1000 nanometers, inclusive), nanoscopic (i.e., between one nanometer and one hundred nanometers, inclusive), and/or picoscopic. For example, the set of rigid structures 170 can exhibit a maximum dimension (e.g., width, diameter, etc.) smaller than a wavelength of visible light (e.g., between 400 nanometers and 700 nanometers). In another example, the set of rigid structures 170 can include a set of PMMA spherical nanoparticles exhibiting maximum diameters less than 300 nanometers. Likewise, the set of rigid structures 170 can protrude from the tactile surface to a microscopic, mesoscopic, nanoscopic, and/or picoscopic height. For example, the set of rigid structures 170 can rise above the tactile surface to a height less than the wavelength of visible light. In this example, the set of rigid structures 170 can define a gradual refractive index gradient as rigid structures that are smaller in diameter and in offset height than wavelengths of visible light minimally affect transmission (i.e. refraction) of light through the tactile layer 110 and limit reflection and, thus, glare of the light off the tactile surface. Additionally, the set of rigid structures 170 can further include a functionalized surface or shell that partially encases the rigid structure and couples (e.g. bonds) each rigid structure in the set of rigid structures 170 to the tactile layer 110. However, the set of rigid structures 170 (and a subset of the set of rigid structures 170) can be arranged on and/or embedded in the tactile layer 110 in any other suitable way. Likewise, the set of rigid structures 170 can include rigid structures arranged on and/or embedded in the tactile layer 110 in various, non-uniform ways.

In one example, the set of rigid structures 170 can include a first subset of hollow (or porous) spherical beads, an outer shell of the bead substantially rigid, an interior chamber filled with fluid, such as air, water, silicon oil, ethanol, etc. The first subset can be arranged over the first region 114 and adhered to the tactile surface, such as with an adhesive. The first subset can, thus, extend to a height above the tactile surface corresponding to a diameter of the hollow spherical beads. The beads can be arranged such that a center-to-center distance between the hollow spherical beads equals the diameter of the spherical beads and, thus, a peripheral surface of a particular hollow spherical bead contacts the peripheral surface of an adjacent hollow spherical bead. The set of rigid structures 170 can also include a second subset of substantially solid frusta with circular bases, each solid frusta defining a first base and a second base opposite the first base, the first of a smaller diameter than the second base. The second subset can be partially embedded in the deformable region 112 of the tactile layer 110, the first base of the frusta embedded within the deformable region 112 and the second base extending above the tactile surface. In another example, the set of rigid structures 170 can include a set of transparent, rigid, and polyhedral particles deposited and adhered to the tactile layer 110, the set of transparent, rigid, and polyhedral particles of a maximum dimension less than a wavelength of visible light.

In one implementation, each rigid structure in the set of rigid structures 170 (or in a subset of rigid structures 170) can extend from the tactile surface to a uniform height above the tactile surface. In this implementation, rigid structures of a similar size can be deposited (e.g., sprayed, rolled, printed) across the layer. Thus, the tactile layer 110 can exhibit substantially uniform anti-reflective properties across all or a portion of the tactile surface. Alternatively, the set of rigid structures 170 can include rigid structures protruding from the tactile surface to various (non-uniform) heights above the tactile surface.

The set of rigid structures 170 can be distributed across the tactile layer no with a particular distribution density (i.e., a number of rigid structures distributed over a unit of area) such that adjacent rigid structures touch or are separated by some distance, thereby forming a valley between the adjacent rigid structures. For example, a set of rigid cubes can be distributed across the tactile layer 110, wherein each side of each cube in the set of rigid cubes is a particular distance away from an adjacent cube in the set of rigid cubes. Alternatively, in another example, the set of rigid cubes can be distributed across the tactile layer 110, wherein each side of each cube in the set of cubes contacts an adjacent side of an adjacent cube in the set of rigid cubes. In this example, the set of rigid cubes can define the second subset of rigid structures 172 over the deformable region 112. Thus, when the deformable region 112 expands, each cube can shift relative to each other cube in the set of cubes, thereby forming a valley (e.g., a "V" shape) between adjacent cubes.

In one example of the foregoing implementation, the set of rigid structures 170 can include the first subset of rigid structures 174 patterned across the first region 114 defining a first distribution density of rigid structures, and the second subset of rigid structures 172 patterned across the deformable region 112 defining a second distribution density of rigid structures, the first distribution density different from the second distribution density. The first subset of rigid structures 174 can define the first distribution density of rigid structures less than the second distribution density of rigid structures. In this example, a higher distribution density of rigid structures over a substantially planar first region 114 can limit glare off the tactile surface by exhibiting a more gradual refractive index gradient than that of the lower distribution density second subset. The higher distribution density of rigid structures can refract incident light more readily with closer adjacent rigid structures than can be obtained with the lower distribution density of rigid structures since incident light can both reflect off a particular rigid structure and refract into the particular rigid structure, thereby becoming incident light to an adjacent particular rigid structure. The incident light can continue to reflect off adjacent rigid structures until a portion of the incident light is absorbed into the tactile layer 110 through refraction or the angle of reflection off the surface changes. Alternatively, the first subset can define a distribution density greater than a distribution density of the second rigid structures Similarly, in one implementation, the set of rigid structures 170 can be distributed across the tactile layer 110 in a particular pattern, such as in rings, in diamond formations, in spirals, etc. For example, the set of rigid structures 170 can be distributed in a serrated or zig-zag configuration. In another example, the second subset of rigid structures 172 can form concentric rings across the deformable region 112, an outermost ring coincident an intersection between the first region 114 and the deformable region 112 and centered about a center of the deformable region 112, each additional ring of a different diameter concentric about the center of the deformable region 112 and within the outermost ring. However, the set of rigid structures 170 can also be randomly or non-uniformly distributed across the tactile layer 110 or form any other pattern across the tactile layer 110.

Figure 4A:
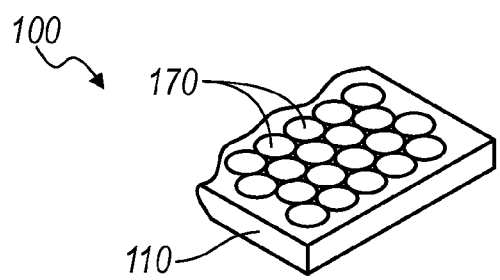
FIGS. 4A-4B are schematic representations of variations of the dynamic tactile interface.
Figure 4B:
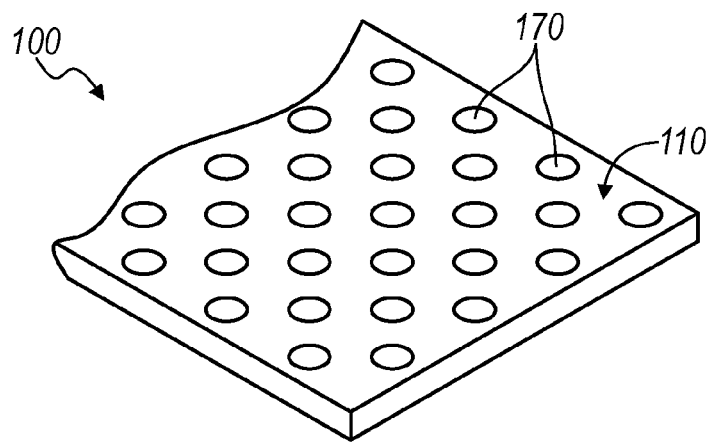

In one example of the foregoing implementation shown in FIGS. 1A and 1B, the tactile surface can be embedded with the set of rigid beads. As shown in FIG. 4A, the beads can be applied in a substantially uniform geometric array, such as according to a fill factor schedule (e.g., the distribution density). The beads can be substantially spherical with substantially uniform diameters, the fill factor schedule can specify that the beads be spaced in a square grid pattern with bead centers separated by twice the spherical diameter of the beads. The beads can also be arranged in a radial pattern, an acute-angle grid pattern, or substantially randomly (shown in FIG. 4B). The fill factor schedule can alternatively specify a surface area coverage percentage (e.g., 85%) for the tactile surface.

The set of rigid structures 170 can be applied over the tactile with an adhesive (e.g., with epoxy), welded to the tactile layer 110 (e.g., laser welded), sputtered over the tactile surface (e.g., vapor sprayed over the surface), magnetically attracted to, or attached to the tactile surface in any other suitable way, such as by a chemically-active functional group. For example, the set of rigid structures 170 can include a set of cylindrical rods, each with a magnetic filament buried within the cylindrical rod. Multiple magnets can be implanted in the tactile layer 110, situated between the tactile layer 110 and the substrate 120, or implanted in the substrate 120, the magnets attracting the magnetic filaments of the cylindrical rods. Alternatively, the tactile layer 110 (and substrate 120) can generate an electromagnetic field that magnetically attracts the magnetic filaments. Additionally, the magnetic filaments can be arranged within the cylindrical rods, such that the rods apply to the tactile layer 110 in a particular orientation (e.g., with a particular end of cylindrical rods adjacent the tactile surface). In another example, the rigid structures can be applied en masse to the tactile layer 110 via vapor deposition or sputtering. In this example, the set of rigid structures 170 can form by sputtering vapor or liquid droplets (e.g., molten silver) across the tactile surface, then curing the vapor such that the droplets harden, forming rigid structures.

To implant the set of rigid structures 170 in the tactile layer 110, the set of rigid structures 170 can be statically charged and smoothed over a flat preparation surface. Each charged rigid structures in the set of rigid structures 170 can repel proximal charged rigid structures, thus dispersing the set rigid structures in a substantially uniform, compact array across the flat preparation surface. The set of rigid structures 170 can also be dispersed over the preparation surface with a shaker, such as an ultrasonic vibrator coupled to the flat preparation surface. The tactile layer 110 can be heated, treated (e.g., corona plasma treatment, surface activation, etc.), or otherwise prepared for implantation and then laid over the beads on the preparation surface. A roller, press, laminator, or other tool can then apply pressure over the attachment surface of the tactile layer 110 to embed the rigid structures in the tactile surface. Likewise, the rigid structures can be dispersed as a liquid within a container with a flat bottom and the fluid can subsequently evaporate to yield substantially even distribution of beads across the flat bottom. The tactile layer 110 can then be applied over the flat bottom of the container to embed the rigid structures in the tactile surface. Generally, the set of rigid structures 170 can be selected based on the size of each rigid structures, the surface area of the tactile surface corresponding to an implantation area of a particular rigid structure, and/or a surface area of the preparation surface in order to achieve the desired distribution density.

Alternatively, the tactile surface can be implanted with rigid structures through a bombardment process. For example, the rigid structures can be applied en masse to the tactile layer 110 via vapor deposition or sputtering. Rigid structures can also be applied to the tactile surface individually, such as with a bead gun or applicator that fires rigid structures into the tactile surface serially (e.g., one bead at a time). However, the beads can be applied and/or embedded in the tactile layer 110 in any other suitable way.

In another implementation, the tactile layer 110 can be cast from a suspension mixture of base material and rigid structures, such as beads. For example, a specified set of spherical glass beads can be suspended in urethane, injected into a cavity mold, and cured. In this example, the tactile layer 110 can be molded as a sheet of uniform thickness. Alternatively, buttons, columns, seats, attachment features, assembly guides, and/or any other suitable features can be directly molded into the tactile layer 110. In this implementation, the tactile layer 110 can be molded such that the rigid structures are dispersed randomly but substantially evenly throughout the tactile layer 110. Alternatively, the beads can be statically charged, such that the rigid structures repel each other once injected into the mold, and then distributed in a grid-like formation of rigid structures within the tactile layer 110. The mold can also form a statically charged cavity, which can orient the set of rigid structures 170 in a particular direction after the rigid structure and the material of the tactile layer 110 (e.g., Silicone) is injected into the mold. For example, urethane defining the tactile layer 110 and cylindrical (or cubic) rigid spheres can be injected into the mold. The statically charged cavity can, thus, align cylindrical (or cubic) spheres in tactile layer 110 of urethane in a direction normal to the tactile surface. However, the rigid structures can be cast into, implanted into, or applied to the tactile surface and/or the tactile layer 110 in any other suitable way.

In an example in which the rigid structures can be partially buried in the tactile surface in a substantially grid-like pattern, the rigid structures can be a size, geometry, material, and index of refraction that effectively yields a moth-eye pattern on the tactile surface. For example, the rigid structures can be of an average thickness substantially less than an average wavelength of visible light, composed of a material with an index of refraction substantially similar to that of a base material of the tactile layer 110, and arranged across the tactile layer 110 in a dense geometric pattern. Thus, the set of rigid structures 170 can exhibit a moth-eye effect at the tactile surface to reduce reflections at the tactile surface. Alternatively, the set of rigid structures 170 can be fully buried within the tactile layer 110 and can be of a material with an index of refractions substantially dissimilar to that of a base material of the tactile layer 110 (or the substrate 120 or the fluid). For example, the set of rigid structures 170 can be of a material with an index of refraction of ~2.0 (e.g., barium titanate glass) and can be embedded in the tactile layer 110 with an index of refraction of ~1.5. For rigid structures of a specified size, geometry, arrangement, and/or spacing, these dissimilar indices of refraction can also yield a moth-eye effect within the tactile layer 110. Thus, the rigid structures can reduce reflection of light (from an external light source) off the tactile surface and function as an anti-reflective or anti-glare coating.

Figure 10A:
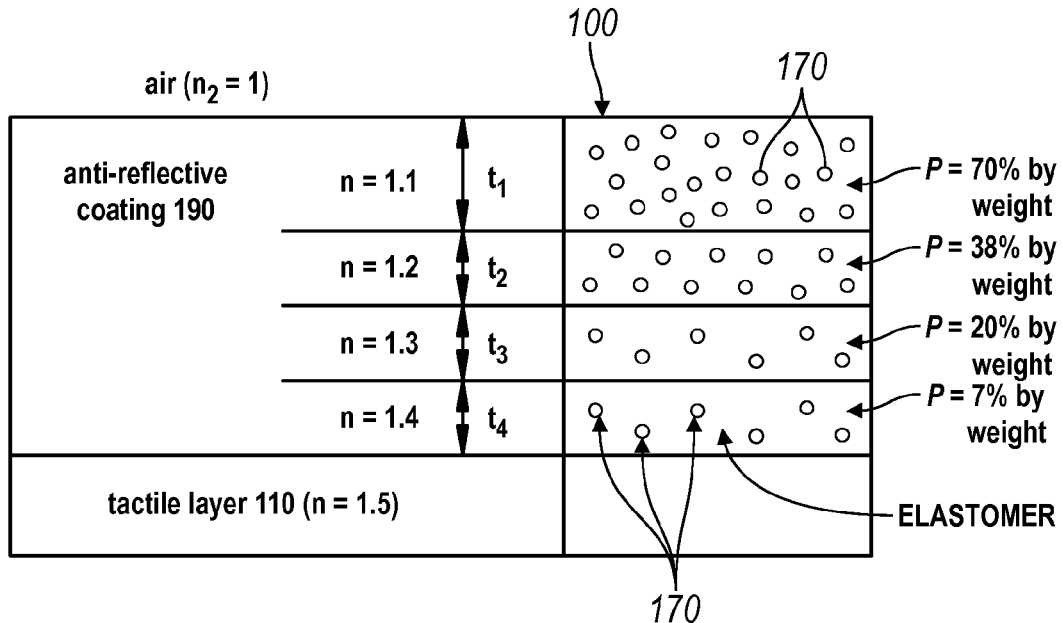
FIGS. 10A and 10B are schematic representations of a variation of the dynamic tactile interface.
Figure 10B:
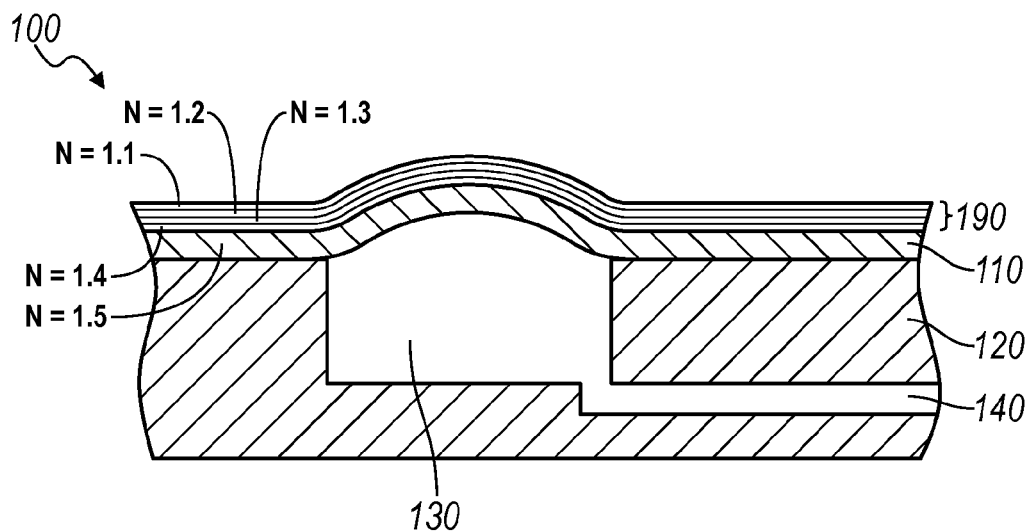

In the foregoing implementation, the set of rigid structures 170 can define the anti-glare or anti-reflective coating, which can include multiple layers of rigid structures, each layer of a different refractive index in order to render a gradual refractive index gradient across the tactile layer 110 and, thus, smooth a transition in optical property (e.g., refractive index, Abbe number) between the tactile layer 110 and air, as shown in FIGS. 10A and 10B. In one example, the set of rigid structures 170 can define a series of layers of rigid structures, each layer with a different distribution density of rigid structures to modify an average optical property (i.e., refractive index) of the corresponding layer. In this example, for a tactile layer 110 with an index of refraction n=1.5, the layers within the coating can define stepped indices of refraction, such as n=1.1 for an outermost layer, n=1.2 for a middle-outer layer, n=1.3 for a middle-inner layer, and n=1.4 for an inner layer. Furthermore, in this example, the thickness of each layer of the coating can be significantly longer than the visible the visible wavelengths of light, reducing the sensitivity of the reflection to variations of thickness of or across individual layers. Alternatively, the thickness of each layer can be substantially uniform with minimized thickness variations, thereby substantially optimizing anti-reflection properties of the stack of layers. In this implementation, the rigid structures within each layer of the coating can effect the average index of refraction of the corresponding layer and each layer can affect the anti-reflective or anti-glare behavior of the tactile layer 110. In particular, the rigid structures can be of very low effective index of refraction. For example, each layer can include the same (or similar) type of porous or hollow rigid nanoparticles but each layer can include a different distribution density of rigid nanoparticles in order to achieve a different average index of refraction in each layer of the rigid structures. Alternatively, each layer can include a different type, size, and/or porosity of rigid structures to achieve different average indices of refraction in the layers of the anti-reflective or anti-glare coating. The set of rigid structures can include, for example, porous silica nanoparticles fully embedded within the tactile layer, the set of rigid structures defining a first layer of rigid structures and a second layer of rigid structures arranged under the first layer of rigid structures, the first layer of rigid structures staggered relative rigid structures of the second layer of rigid structures such that rigid structures of the first layer are horizontally offset from a vertical projection of the rigid structures of the second layer.

In a variation of the dynamic tactile interface 100, to achieve an anti-glare effect, anti-reflection effect, wear resistance, and/or abrasion resistance, the tactile layer no can incorporate cilia-like structures that can be physically coextensive with the tactile layer 110. For example, microscopic and/or nanoscopic cilia-like structures, extending from the tactile surface, can be cast directly into the tactile layer 110. Alternatively, portions of the tactile layer 110 can also be removed at the tactile surface to form discrete columns, cilia, beads, pyramids, or other structures, such as by etching, machining, engraving, stereo lithography, or bulk machining. Cilia-like structures can also be stamped or imprinted into the tactile surface or can be formed by rolling the tactile layer 110 through a heated textured roller. However, cilia-like structures can be formed into the tactile layer 110 in situ or in any other subsequent manufacturing process.

In another variation of dynamic tactile interface 100, a layer of rigid material can be grown, deposited, cast, or otherwise bonded to the tactile surface of the tactile layer 110. Portions of the layer can be removed to form discrete columns, cilia, beads, pyramids, or other structures on the tactile surface, such as by etching, machining, engraving, stereo lithography, or bulk machining, as shown in FIGS. 5 and 6. The layer can additionally or alternatively be of a hardness, index of refractions, optical absorptivity, dry or wet etch selectivity, etc. that differs from that of the tactile layer 110 or substrate 120. However, any other type of rigid structure of any other material and geometry can be incorporated into the tactile layer 110 according to any other method or technique to reduce reflection and/or glare at the tactile surface and/or improve scratch, wear, and/or abrasion resistance of the tactile layer 110 at the tactile surface.

Figure 7:
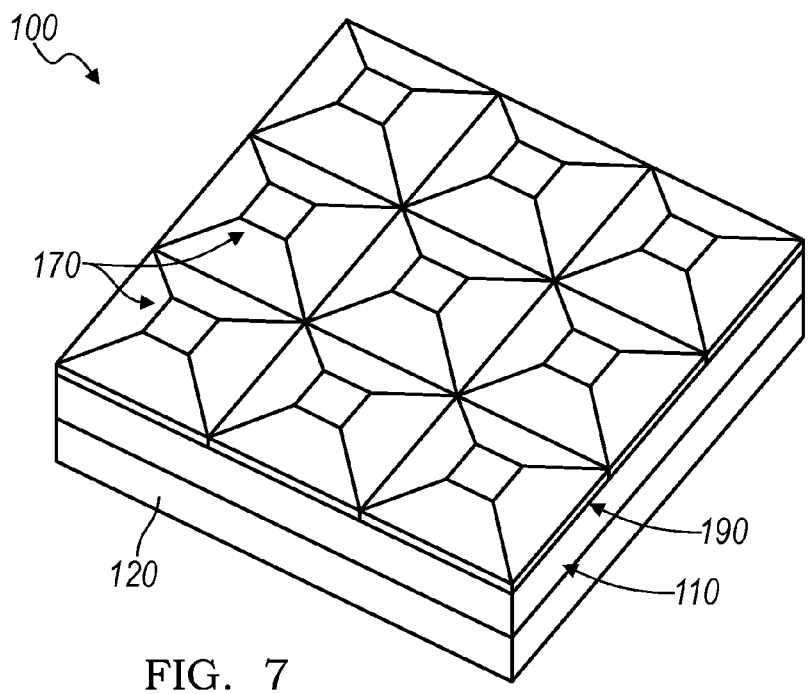
FIG. 7 is a schematic representation of a variation of the dynamic tactile interface.
Figure 8:
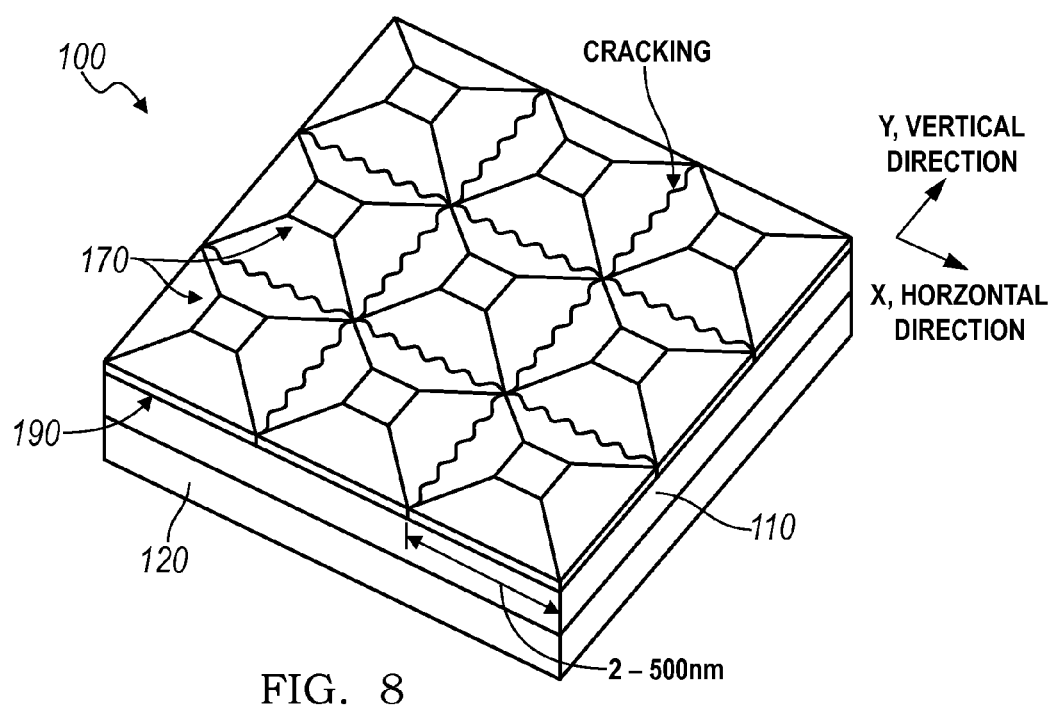
FIG. 8 is a schematic representation of a variation of the dynamic tactile interface.
Figure 11A:
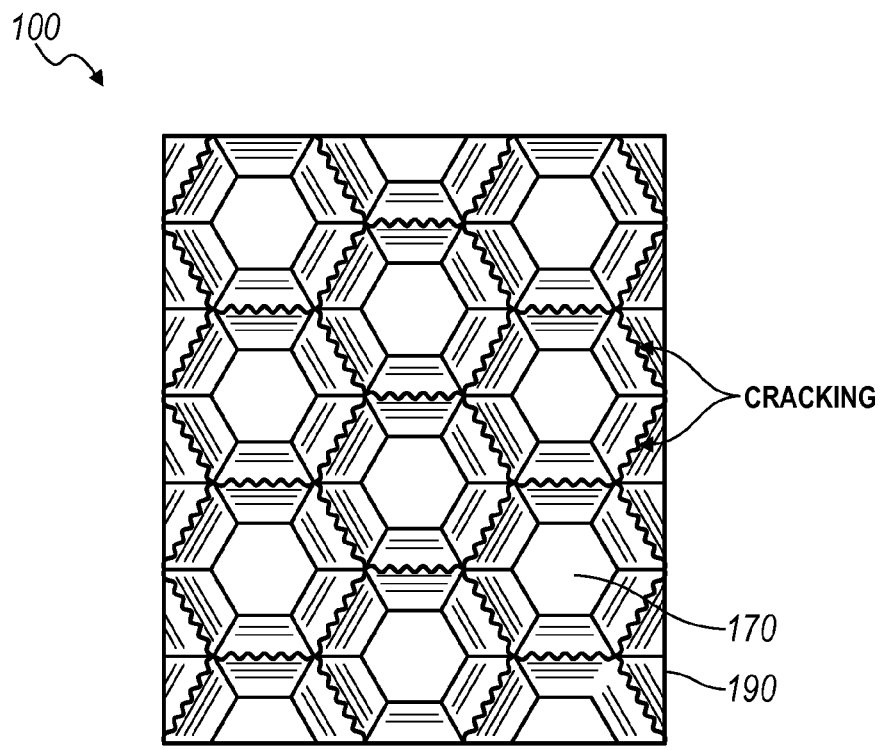
FIGS. 11A and 11B are schematic representations of a variation of the dynamic tactile interface.
Figure 11B:
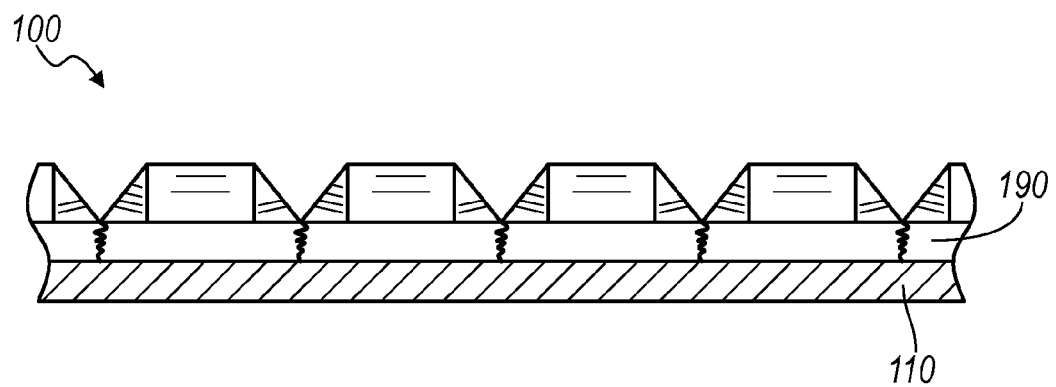

In another variation of the dynamic tactile interface 100, the set of rigid structures 170 defines an anti-reflective layer 190 coupled to and arranged over the tactile layer 110 along an attachment surface of the anti-reflective layer 190, the anti-reflective layer 190 substantially firm, the set of rigid structures 170 patterned across a surface of the anti-reflective layer 190 opposite the attachment surface and extending from the attachment surface. In this variation, the anti-reflective layer 190 can feature a two-dimensional array of square-base frusto-pyramidal rigid structures extending outwardly opposite the substrate 120, as shown in FIG. 7. The two-dimensional array can be substantially linear or form a non-linear pattern (e.g., a honeycomb pattern, wherein a periphery of each rigid structure form a honeycomb shape, as shown in FIGS. 11A and 11B). The rigid structures can be patterned in two perpendicular directions. In one example, the rigid structures can be patterned with base edges arranged in a first direction parallel to x-direction electrodes of an adjoining capacitive touch sensor 106 and with base edges arranged in a second direction parallel to y-direction electrodes of the adjoining capacitive touch sensor 106. In a similar example, the rigid structures are patterned with base edges along a first direction parallel to a horizontal pixel pattern of an adjoining display 102 and with base edges along a second direction parallel to a vertical pixel pattern of the adjoining display 102. Therefore, base edges of the rigid structures can run parallel to one of two perpendicular directions across the anti-reflective layer 190. Base edges of the rigid structures can additionally or alternatively be arranged along (i.e., over) fluid channels 140 and/or fluid conduits within the substrate 120. Adjacent rigid structures can share base edges of a common length, thus forming valleys between adjacent rigid structures. For example, perpendicular base edges of each rigid structure can be between fifty nanometers and 500 nanometers in length, as shown in FIG. 8. Alternatively, base edges of adjacent rigid structures can be offset, such as by two nanometers and up to twenty nanometers. The anti-reflective layer 190 can be adhered, bonded, impregnated, or otherwise arranged over and/or (at least partially) within the tactile surface.

Generally, fatigue and/or cracking can affect optical clarity of a transparent material, such as in the form of visible striations or stress fractures that can radiate and propagate throughout the material. Thus, in this variation, each frusto-pyramidal rigid structure can define an independent structure with rigidity proportional to thickness. Proximal the base center of the rigid structure, the independent structure can be of higher strength and rigidity than strength and rigidity proximal the base edges of the rigid structure (i.e., at the bottom of valleys between adjacent rigid structures). In this variation, the rigid structures arranged over the tactile layer 110 can, thus, afford thin parallel regions of lower strength and rigidity peripheral base edges of the rigid structures in a first direction than strength of the independent structure proximal the base center. Likewise, the rigid structures arranged over the tactile layer 110 can exhibit thin parallel regions of lower strength peripheral base edges of the rigid structures in a second direction perpendicular to the first direction than strength of the independent structure proximal the base center. With rigid structures thus patterned across the tactile layer 110, an impact to the dynamic tactile interface 100 causing deformation of the tactile layer 110 can yield controlled (or preferential) fatigue or cracking along base edges of the pyramids, as shown in FIG. 8. For example, when the dynamic tactile interface 100 is dropped on hard surface, damage to the tactile layer 110 can propagate along the thin parallel regions (i.e., valley s between rigid structures). The base edges of the rigid structures can be parallel or coincident a periphery of pixels in a pixel pattern, subpixels in subpixel subpixel pattern, touch sensor 106 electrodes, fluid channels 140, and/or any other geometric feature within the dynamic tactile interface 100. Cracks and/or fatigue resulting from instantaneous or repetitive (e.g., cyclic) deformation of the tactile layer 110 can cause apparent striations (e.g., resulting from plastic deformation) and/or cracks within the anti-reflective layer 190 that run along and/or parallel to such geometric features, and the geometric features may, thus, mask or disguise damage to the tactile layer 110. Therefore, geometric arrangement of the rigid structures across the tactile layer 110 can control cracking or fatigue across the tactile layer 110 and, thus, control formation of optical aberrations, which can interfere with an image rendered by a display 102 arranged beneath the tactile layer 110. Furthermore, by controlling cracking across the anti-reflective layer 190, the anti-reflective layer 190 can yield a flexible layer of substantially rigid structures arranged over the tactile layer 110, the flexible layer conforming to tactile layer 110, such as when the deformable region 112 transitions to the expanded setting. Thus, micro-, meso-, and/or nanoscopic cracks can function to refract incident light and limit reflection of the tactile surface.

In an implementation of the foregoing variation, the tactile layer 110 can include a silicone inner sublayer and a polycarbonate outer sublayer as described in U.S. patent application Ser. No. 14/035,851, which is incorporated in its entirety by this reference. In this implementation, silicone oxide can be deposited over the polycarbonate outer sublayer and then etched (e.g., via a bulk micromachining process) to form the array of frusto-pyramidal rigid structures. For example, the silicone oxide layer deposited on the polycarbonate layer can be twenty nanometers thick and etched to a minimum thickness of less than two nanometers at the base edges of the rigid structures. Alternatively, the rigid structures can be etched, machined, molded, imprinted, engraved (e.g., with a laser), or otherwise formed in the polycarbonate outer sublayer directly. However, the rigid structures and the tactile layer 110 can be of any other material or composite of materials and formed in any other way, and the rigid structures can be physically coextensive with the tactile layer 110 or deposited, grown, fabricated, adhered, or installed, etc. over the tactile layer 110 in any other suitable way.

An example of the foregoing variation includes the anti-reflective layer 190 can include a transparent layer defining a set of frusta patterned across the anti-reflective layer 190, each frustum in the set of frusta spaced a distance from each adjacent frustum. The anti-reflective layer 190 can preferentially crack between adjacent frustra forming a substantially linear fissure, the fissure defining a facet for reflecting light. Alternatively, the anti-reflective layer 190 can define a set of hexagonal rigid structures chambered in a honeycomb pattern, the anti-reflective layer 190 preferentially cracking along a periphery of each hexagonal rigid structure.

In the foregoing variation, the square-base frusto-pyramidal rigid structures can further function as beads of the moth-eye pattern described above to reduce glare at the tactile surface and/or to increase resilience of the tactile surface to scratches or other superficial damage.

Figure 9A:
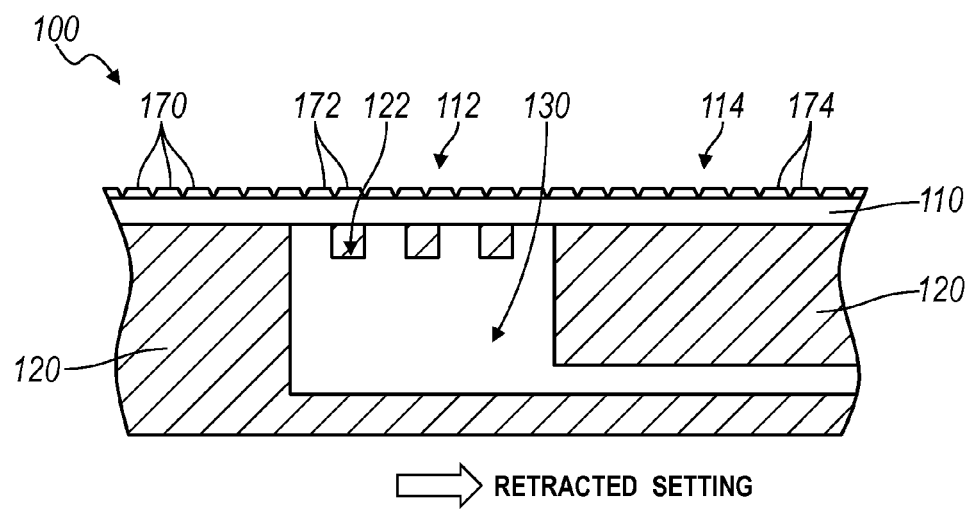
FIGS. 9A-9B are schematic representations of variations of the dynamic tactile interface.
Figure 9B:
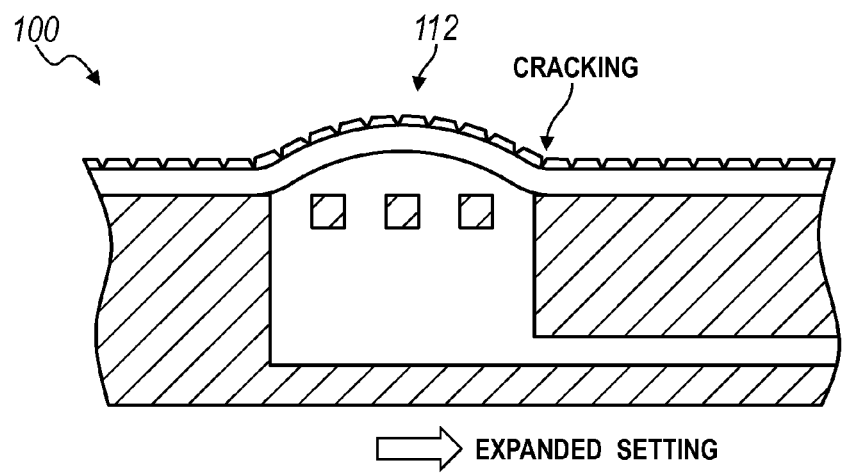

Furthermore, in the foregoing variation, the rigid structure structures can accommodate expansion and retraction of the deformable region 112 of tactile layer 110 between expanded and retracted settings by cracking or fatiguing along valleys proximal regions of the tactile layer 110 exhibiting (substantial) deformation. For example, valleys between rigid structures along the perimeter of the deformable region 112 can fatigue or crack when the deformable region 112 is (first) transitioned from the retracted setting to the expanded setting, as shown in FIGS. 9A and 9B. However, the rigid structures can be of any other form, any other material(s), arranged in any other way over the tactile layer 110, and deformable, fatigue, and/or crack relative to one another in any other suitable way.

Figure 13A:
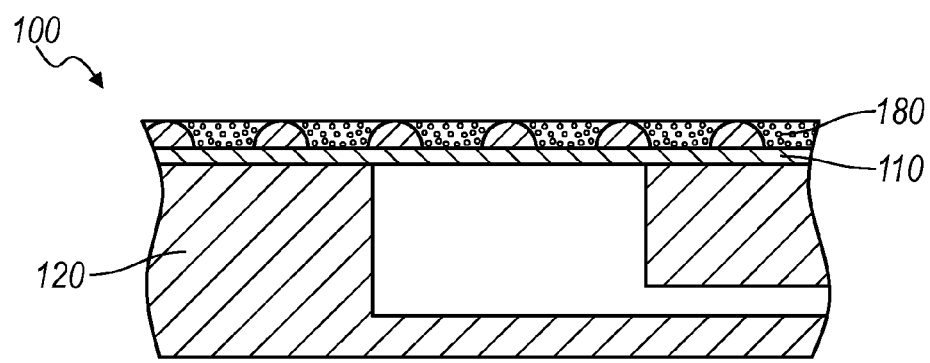
FIGS. 13A and 13B are schematic representations of a variation of the dynamic tactile interface.
Figure 13B:
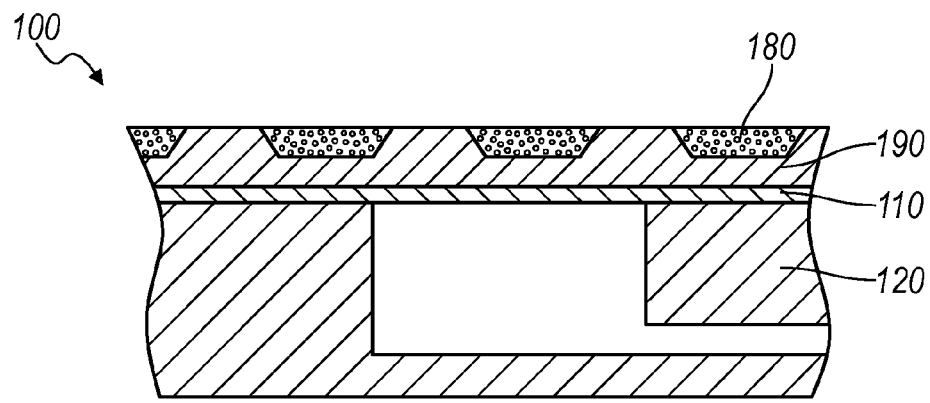

Another variation of the dynamic tactile interface 100, shown in FIGS. 13A and 13B, can include a viscoelastic cover layer 180 arranged over the anti-reflective layer 190 or the set rigid structures, the cover layer 180 flowing into valleys between adjacent rigid structures and forming a substantially continuous refractive index gradient between atmospheric air and the tactile layer 110. Generally, the viscoelastic cover layer 180 can function to prevent debris build-up between rigid structures to maintain optical clarity through the tactile surface and retain anti-reflective properties of the set of rigid structures 170.

In one example, once anti-reflective layer is fabricated and applied over the tactile layer 110, silicone can be spread over the rigid structures, the tactile layer 110-rigid structure-silicone stack pressed between mirror-polished parallel plates, and the silicone cured, thus leaving a smooth outer surface over the tactile layer 110 with the small broad faces of each rigid structure exposed and silicone spanning areas between small broad faces of adjacent rigid structures. In this implementation, the silicone can be of an index of refraction similar to that of the rigid structure material (e.g., at the center of the visible spectrum, or at ~550 nm) and/or the silicone can be a material with an Abbe number or chromatic dispersion property similar to that of the rigid structure material such that interface between the silicone filler and the rigid structures is not easily distinguished by a user at a typical viewing distance from the dynamic tactile interface 100 (e.g., 12"). Alternatively, in implementations in which the index of refraction (or Abbe number or chromatic dispersion) of the tactile differs dramatically from that of the rigid structure material, valleys between rigid structures can be filled with an alternative material to achieve an average index of refraction across the rigid structures and valley filler materials that better approximates that of the tactile layer 110. However, the filler between rigid structures can be of any other material and formed within the dynamic tactile interface 100 in any other suitable way.

6. Displacement Device

The displacement device 150 can fluidly couple to the fluid channel 140, the displacement device 150 displacing fluid into the fluid channel 140 to transition the deformable region 112 from a retracted setting to an expanded setting, the deformable region 112 tactilely distinguishable from the first region 114 in the expanded setting, the second subset of rigid structures 172 conforming to the deformable region 112, each rigid structure in the second subset of rigid structures 172 shifting relative to an adjacent rigid structure in the second subset of rigid structures 172 and shifting relative to each rigid structure in the first subset of rigid structures 174, the first subset of rigid structures 174 conforming to the first region 114. Generally, the displacement device 150 functions to displace fluid into and out of the fluid channel 140 to transition the deformable region 112 between the expanded setting and the retracted setting, respectively. The deformable region 112 can be substantially flush with the first region 114 in the retracted setting and can be offset above the first region 114 in the expanded setting. The displacement device 150 can therefore manipulate the volume of fluid 160 within the fluid channel 140 and the variable volume 130 (e.g., by pumping fluid into and out of the fluid channel 140 and the variable volume 130) to adjust a vertical position of the deformable region 112 above the first region 114, a firmness of the deformable region 112, and/or a shape of the deformable region 112, etc.

As described in U.S. patent application Ser. No. 12/652, 704, which is herein incorporated by this reference, the displacement device 150 can include an electromechanically-actuated pump, an electroosmotic pump, a manually-actuated pump, or any other suitable pump or mechanism suitable for actively displacing fluid into and/or out of the substrate 120. However, the displacement device 150 can include any other suitable type of device that functions in any other way to transition the deformable region(s) between the expanded and retracted settings.

The displacement device 150 can also transition the deformable region 112 between the retracted setting substantially flush with the first region 114 and the expanded setting tactilely distinguishable from and offset above the first region 114.

In a variation of the dynamic tactile interface, the tactile layer 110 can further define a second deformable region 112 adjacent the first region 114, the substrate 120 defining a second variable volume 130 adjacent the second first region 114 and fluidly coupled to the fluid channel 140; the volume of transparent fluid further contained within the second variable volume 130; and the displacement device 150 displaces fluid into the fluid channel 140 transitioning the deformable region 112 and the second deformable region 112 from the retracted setting into the expanded setting substantially simultaneously. For example, in this variation, the (first) and second deformable regions 112 can function as transient hard keys corresponding to discrete virtual keys of a virtual keyboard rendered on a display 102 coupled to the dynamic tactile interface 100, and the displacement device 150 can displace fluid into and out of the fluid channel 140 to transition the (first), second, and other deformable regions 112 correspond to the virtual keyboard substantially simultaneously.

7. Volume of Fluid

One variation of the dynamic tactile interface 100 can include volume of transparent fluid contained within the channel and the variable volume 130, the displacement device 150 displacing a portion of the volume of fluid 160 into the channel to transition the deformable region 112 from the retracted setting into the expanded setting. Generally, the volume of fluid 160 can function to flow through the fluid channel 140 and the variable volume 130 in order to transition the deformable region 112 between the expanded and retracted settings. The volume of fluid 160 can be manipulated by the displacement device 150 to selectively transition the deformable region 112 between the expanded setting and the retracted setting. For example, the displacement device 150 can pump fluid into the fluid channel 140 within the substrate 120 to expand the deformable region 112, thereby transitioning the deformable region 112 from the retracted setting into the expanded setting, and the displacement device 150 can pump fluid out of the fluid channel 140 to retract the deformable region 112, thereby transitioning the deformable region 112 from the expanded setting back into the retracted setting.

The volume of fluid can be substantially transparent, translucent, and/or opaque. Additionally, the volume of fluid can function to generate a gradual refractive index gradient across the tactile layer. For example, the volume of fluid can include suspended particulate (e.g., PMMA nanoparticules) that affect optical transmission of light through the tactile layer. Thus, the volume of fluid can aid transmission of light through the tactile layer and limit reflection off the tactile surface.

8. Display

Figure 14:
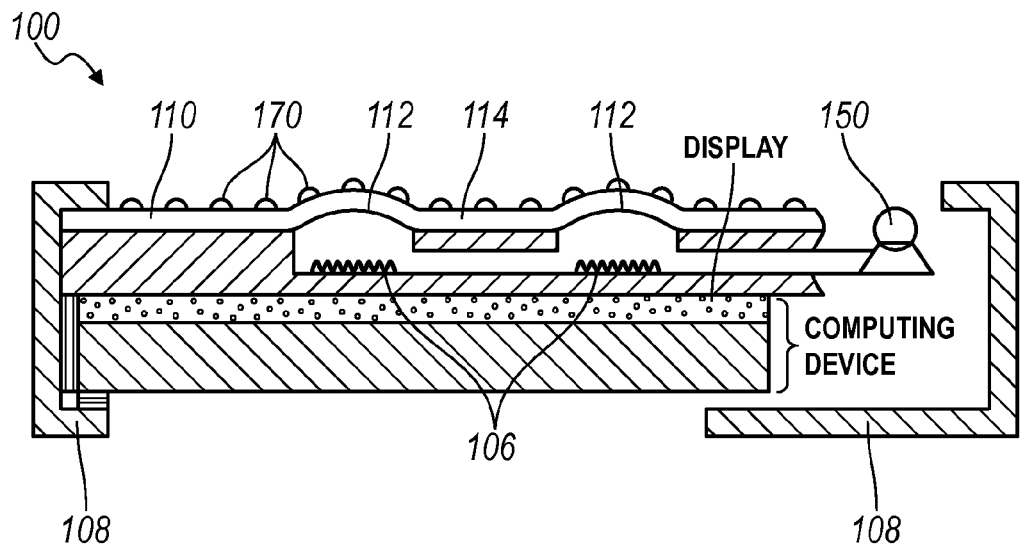
FIG. 14 is a schematic representation of a variation of the dynamic tactile interface.

Another variation of the dynamic tactile interface 100 shown in FIG. 14 can include a display 102 coupled to the substrate 120 opposite the tactile layer 110 and rendering an image of a key substantially aligned with the deformable region 112. Generally, the display 102 can render an image of an input key proximal the deformable region 112, such as described above and in U.S. patent application Ser. No. 13/414,589. The dynamic tactile interface 100 can also include a housing 108 transiently engaging a mobile computing device, the housing 108 transiently retaining the substrate 120 over a digital display 102 of the mobile computing device. For example, the dynamic tactile interface 100 can include an aftermarket housing 108 that surrounds the mobile computing device and arranges the dynamic tactile interface 100 substantially over the display 102 of the mobile computing device. The display 102 can also function to transmit light in the form of an image through the substrate 120 and the tactile layer 110. For example, the display 102 can render an image of an alphanumeric input key of a keyboard aligned with the deformable region 112, thereby indicating an input associated with the deformable region 112. In this example, when the deformable region 112 is in the expanded setting and the display 102 outputs an image of the alphanumerical character "a", selection of the deformable region 112—sensed by the touch sensor 106—can be correlated with selection of the character "a", and the mobile computing device incorporating the dynamic tactile interface 100 can response to the input by adding the character "a" in a text field (e.g., with a SMS text messaging application executing on the mobile computing device). However, the display 102 can function in any other way to display 102 an image of any other type.

9. Sensor

Another variation of the dynamic tactile interface 100 can include a touch sensor 106 coupled to the substrate 120 and outputting a signal corresponding to an input on a tactile surface of the tactile layer 110 adjacent the deformable region 112 and adjacent the anti-reflective coating. The touch sensor 106 of the dynamic tactile interface 100 can detect an input on the tactile surface. Generally, the sensor 106 functions to sense a change in an electric field or electrical property across the tactile layer 110 and/or substrate 120 and to output a signal accordingly, such that a processor within the computing device can detect an input into the computing device based on the signal. Then the computing device can respond accordingly, such as described in U.S. patent application Ser. No. 13/896,098. The sensor 106 can include a capacitive touch sensor 106 interposed between the substrate 120 and a display 102 coupled to the substrate 120, the capacitive touch sensor 106 outputting a signal corresponding to an input on a tactile surface of the tactile layer 110 proximal the deformable region 112. The sensor 106 can additionally or alternatively output a signal corresponding to a change in fluid pressure within the fluid channel 140 in response to a force applied to the deformable region 112 of the tactile layer 110. Alternatively, the sensor 106 can include a strain gauge integrated into the tactile layer 110 or arranged between the tactile layer 110 and the substrate 120 and configured to output a signal corresponding to deformation of the tactile layer 110. However, the sensor 106 can function in any other way to detect an input on the tactile surface at the deformable region 112 and/or at the peripheral region.

In one implementation, the touch sensor 106 includes a capacitive, resistive, optical, or other suitable type of touch sensor 106 arranged (i.e., interposed) between the display 102 and the substrate 120. In this implementation, like the display 102 and/or the substrate 120, the touch sensor 106 can be impregnated with particulate to yield a substantially smooth Abbe number gradient (or a substantially smooth gradient of any other optical property or characteristic) across a junction between the touch sensor 106 and the substrate 120 and across a junction between the touch sensor 106 and the display 102. Similarly, the touch sensor 106 can include a sheet of transparent material exhibiting a first index of refraction different from a second index of refraction of a base material of an adjacent sublayer of the substrate 120; and a second volume of particulate can be arranged within (e.g., impregnated into) the adjacent sublayer of the substrate 120 and can cooperate with the adjacent sublayer to exhibit a bulk index of refraction approximating the first index of refraction of the sheet of the touch sensor 106 (e.g., for a particular wavelength of light in the visible spectrum).

In this variation, the display 102 can be coupled to the touch sensor 106 opposite the substrate 120. Alternatively, the touch sensor 106 can be integrated into the display 102 to form a touchscreen. For example, the display 102 can render an image of a virtual input key substantially aligned with the deformable region 112 in the expanded setting, and the touch sensor 106 can output a signal corresponding to an input on the tactile surface adjacent the deformable region 112. However, the touch sensor 106 can be arranged at any other depth with the dynamic tactile interface 100 and/or can be incorporated into (e.g., physically coextensive with) any other component of the dynamic tactile interface 100.

10. Housing

Another variation of the dynamic tactile interface 100 can include a housing 108 transiently engaging a mobile computing device, the housing 108 transiently retaining the substrate 120 over a display 102 of the mobile computing device. Generally, in this variation, the housing 108 functions to transiently couple the dynamic tactile interface 100 over a display 102 (e.g., a touchscreen) of a discrete (mobile) computing device, such as described in U.S. patent application Ser. No. 12/830,430. For example, the dynamic tactile interface 100 can define an aftermarket device that can be installed onto a mobile computing device (e.g., a smartphone, a tablet) to update functionality of the mobile computing device to include transient depiction of physical guides or buttons over a touchscreen of the mobile computing device. In this example, the substrate 120 and tactile layer 110 can be installed over the touchscreen of the mobile computing device, a manually-actuated displacement device 150 can be arranged along a side of the mobile computing device, and the housing 108 can constrain the substrate 120 and the tactile layer 110 over the touchscreen and can support the displacement device 150. However, the housing 108 can be of any other form and function in any other way to transiently couple the dynamic tactile interface 100 to a discrete computing device.

The systems and methods of the invention can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention as defined in the following claims.

We claim:

1. A dynamic tactile interface with an anti-reflective coating comprising:
   a tactile layer defining a first region and a deformable region adjacent the first region;
   a substrate coupled to the tactile layer at the first region, defining a variable volume adjacent the deformable region and defining a fluid channel fluidly coupled to the variable volume;
   a set of rigid structures distributed across the tactile layer and over the tactile layer, the set of rigid structures comprising a first subset of rigid structures coincident the first region and a second subset of rigid structures coincident the deformable region, wherein:
      the set of rigid structures comprises a set of acrylate polymer spherical nanoparticles exhibiting maximum diameters less than 300 nanometers,
      or
      the first subset of rigid structures comprises rigid structures of a trapezoidal cross-section and a first size and the second subset of rigid structures comprises rigid structures of a hemispherical shape and second size, the first size exhibiting a maximum dimension greater than a corresponding maximum dimension of the second size; and
   a displacement device fluidly coupled to the fluid channel, the displacement device displacing fluid into the fluid channel to transition the deformable region from a retracted setting to an expanded setting, the deformable region tactilely distinguishable from the first region in the expanded setting, the second subset of rigid structures conforming to the deformable region, each rigid structure in the second subset of rigid structures shifting relative to an adjacent rigid structure in the second subset of rigid structures and shifting relative to each rigid structure in the first subset of rigid structures, the first subset of rigid structures conforming to the first region.

2. The dynamic tactile interface of claim 1, wherein the set of rigid structures further comprises a third subset of rigid structures coincident an intersection of the deformable region and the first region; wherein the displacement device transitions the deformable region, each rigid structure in the third subset of rigid structures shifting relative to an adjacent rigid structure in the third subset of rigid structures, each rigid structure in the first subset of structures, and each rigid structure in the second subset of structures.

3. The dynamic tactile interface of claim 2, wherein the displacement device transitions the deformable region to the expanded setting, each rigid structure in the first subset of rigid structures maintaining a substantially planar configuration, each rigid structure in the second subset of rigid structures shifting to a substantially convex configuration coincident the deformable region, each rigid structure in the third subset of rigid structures shifting to a substantially concave configuration.

4. The dynamic tactile interface of claim 1, wherein the set of rigid structures comprise a set of substantially transparent, substantially rigid, polyhedral particles deposited and adhered to the tactile layer, the set of substantially transparent, substantially rigid, polyhedral particles of a maximum dimension less than one wavelength of visible light.

5. The dynamic tactile interface of claim 1, wherein the displacement device transitions the deformable region between the retracted setting substantially flush with the first region and the expanded setting tactilely distinguishable from and offset above the first region.

6. The dynamic tactile interface of claim 1, further comprising a volume of transparent fluid contained within the channel and the variable volume; wherein the displacement device displaces a portion of the volume of fluid into the channel to transition the deformable region from the retracted setting into the expanded setting.

7. The dynamic tactile interface of claim 1, further comprising a touch sensor coupled to the substrate and outputting a signal corresponding to an input on a tactile surface of the tactile layer adjacent the deformable region and adjacent the anti-reflective coating.

8. The dynamic tactile interface of claim 1, further comprising a display coupled to the substrate opposite the tactile layer and rendering an image of a virtual key substantially aligned with the deformable region.

9. The dynamic tactile interface of claim 1, wherein the set of rigid structures comprises substantially transparent spheres; wherein the substrate comprises a substantially transparent material; and wherein the tactile layer comprises a substantially transparent layer.

10. The dynamic tactile interface of claim 1, wherein the set of rigid structures defines a uniformly distributed pattern of rigid structures extending from the tactile layer.

11. The dynamic tactile interface of claim 1, further comprising a housing transiently engaging a mobile computing device, the housing transiently retaining the substrate over a display of the mobile computing device.

12. The dynamic tactile interface of claim 1, wherein the set of rigid structures comprises a set of structures partially embedded in the tactile layer, each structure in the set of structures protruding from the tactile surface at a uniform height above the tactile surface.

13. A dynamic tactile interface with an anti-reflective coating comprising:
   a tactile layer defining a first region and a deformable region adjacent the first region;
   a substrate coupled to the tactile layer at the first region, defining a variable volume adjacent the deformable region and defining a fluid channel fluidly coupled to the variable volume;
   a set of rigid structures distributed across the tactile layer and over the tactile layer, the set of rigid structures comprising a first subset of rigid structures coincident the first region and a second subset of rigid structures coincident the deformable region,
   wherein the set of rigid structures defines an anti-reflective layer coupled to and arranged over the tactile layer along an attachment surface of the anti-reflective layer, the anti-reflective layer substantially firm, the set of rigid structures patterned across a surface of the anti-reflective layer opposite the attachment surface and extending from the attachment surface; and wherein the displacement device transitions the deformable region into the expanded setting, a portion of the anti-reflective layer coincident the deformable region conforming to the deformable region, a second portion of the anti-reflective layer coincident the first region conforming to the first region, and
   wherein:
      the anti-reflective layer comprises a transparent layer defining a set of frusta patterned across the anti-reflective layer, a base of each frustum in the set of frusta spaced a distance from the base of each adjacent frustum, the anti-reflective layer preferentially cracking between adjacent frusta forming a substantially linear fissure, or the anti-reflective layer defines a set of hexagonal rigid structures chambered in a honeycomb pattern, the anti-reflective layer preferentially cracking along a periphery of each hexagonal rigid structure.

14. A dynamic tactile interface with an anti-reflective coating comprising:
   a tactile layer defining a first region and a deformable region adjacent the first region;
   a substrate coupled to the tactile layer at the first region, defining a variable volume adjacent the deformable region and defining a fluid channel fluidly coupled to the variable volume;
   a set of rigid structures distributed across the tactile layer and over the tactile layer, the set of rigid structures comprising a first subset of rigid structures coincident the first region and a second subset of rigid structures coincident the deformable region,
   wherein the set of rigid structures comprises porous silica nanoparticles fully embedded within the tactile layer, the set of rigid structures defining a first layer of rigid structures and a second layer of rigid structures arranged under the first layer of rigid structures, the first layer of rigid structures staggered relative to rigid structures of the second layer of rigid structures and horizontally offset from a vertical projection of the rigid structures of the second layer of rigid structures.

15. The dynamic tactile interface of claim 14, further comprising a viscoelastic cover layer arranged over the anti-reflective layer, the cover layer flowing into valleys between adjacent rigid structures and forming a substantially continuous refractive index gradient between atmospheric air and the tactile layer.

16. The dynamic tactile interface of claim 14, wherein the set of rigid structures comprises the first subset of rigid structures patterned across the first region defining a first density of rigid structures, and the second subset of rigid structures patterned across the deformable region defining a second density of rigid structures, the first density different from the second density.

17. The dynamic tactile interface of claim 15, wherein the first subset of rigid structures defines the first density of rigid structures less than the second density of rigid structures.

18. The dynamic tactile interface of claim 14, wherein the tactile layer defines a second deformable region adjacent the first region; wherein the substrate defines a second variable volume adjacent the first deformable region and fluidly coupled to the channel; wherein the displacement device transitions the deformable region and the second deformable region from the retracted setting into the expanded setting substantially simultaneously.

\* \* \* \* \*